(12) United States Patent
Narita et al.

(10) Patent No.: US 11,029,766 B2
(45) Date of Patent: Jun. 8, 2021

(54) INFORMATION PROCESSING APPARATUS, CONTROL METHOD, AND STORAGE MEDIUM

(71) Applicant: SONY CORPORATION, Tokyo (JP)

(72) Inventors: Tomoya Narita, Kanagawa (JP); Taku Inoue, Kanagawa (JP); Takehiro Hagiwara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 102 days.

(21) Appl. No.: 14/901,683

(22) PCT Filed: Mar. 31, 2014

(86) PCT No.: PCT/JP2014/059530
§ 371 (c)(1),
(2) Date: Dec. 28, 2015

(87) PCT Pub. No.: WO2014/208168
PCT Pub. Date: Dec. 31, 2014

(65) Prior Publication Data
US 2016/0370883 A1 Dec. 22, 2016

(30) Foreign Application Priority Data
Jun. 26, 2013 (JP) .............................. JP2013-133891

(51) Int. Cl.
*G06F 3/0346* (2013.01)
*G06F 3/01* (2006.01)
(Continued)

(52) U.S. Cl.
CPC ............ *G06F 3/0346* (2013.01); *G02B 27/20* (2013.01); *G06F 3/017* (2013.01); *G06F 3/0354* (2013.01);
(Continued)

(58) Field of Classification Search
CPC ................. G06F 3/0346; G06F 3/0386; G06F 2203/0383; G06F 3/0425; G06F 3/017;
(Continued)

(56) References Cited

U.S. PATENT DOCUMENTS 5,712,658 A * 1/1998 Arita .................... G06F 3/03542
345/158
2005/0260986 A1* 11/2005 Sun ........................ G06F 3/0386
455/433

(Continued)

FOREIGN PATENT DOCUMENTS

JP 2010-152717 A 7/2010
JP 2012-053545 A 3/2012
(Continued)

*Primary Examiner* — Patrick N Edouard
*Assistant Examiner* — Douglas M Wilson
(74) *Attorney, Agent, or Firm* — Chip Law Group

(57) ABSTRACT

There is provided an information processing apparatus including: a recognition unit which recognizes an irradiation position of laser light by a laser pointer to a projection image; an acquisition unit which acquires movement information of the laser pointer; and an output unit which outputs a control signal for causing display of an object within a projection image corresponding to the irradiation position to be changed in accordance with the movement information.

14 Claims, 24 Drawing Sheets

(51) Int. Cl.
*G06F 3/038* (2013.01)
*G02B 27/20* (2006.01)
*G06F 3/0484* (2013.01)
*G06F 3/042* (2006.01)
*G06F 3/0354* (2013.01)

(52) U.S. Cl.
CPC .......... *G06F 3/0386* (2013.01); *G06F 3/0425* (2013.01); *G06F 3/04845* (2013.01); *G06F 2203/0383* (2013.01); *G06F 2203/0384* (2013.01); *G06F 2203/04806* (2013.01)

(58) Field of Classification Search
CPC ............... G06F 3/04845; G06F 3/0354; G06F 2203/04806; G06F 2203/0384; G02B 27/20
See application file for complete search history.

(56) References Cited

U.S. PATENT DOCUMENTS

| | | | | |
|---|---|---|---|---|
| 2006/0146015 A1* | 7/2006 | Buchmann | ......... | G02B 26/0883 345/156 |
| 2010/0073578 A1* | 3/2010 | Tan | ....... | G03B 21/006 348/744 |
| 2011/0102315 A1* | 5/2011 | Draaijer | ................. | G08C 23/04 345/156 |
| 2011/0227827 A1* | 9/2011 | Solomon | ............. | G06F 3/03542 345/158 |
| 2013/0334441 A1* | 12/2013 | Croft | ....................... | G02B 5/208 250/458.1 |
| 2014/0176420 A1* | 6/2014 | Zhou | ....................... | G06F 3/011 345/156 |
| 2016/0139691 A1* | 5/2016 | Li | ....................... | G06F 3/03545 345/179 |

FOREIGN PATENT DOCUMENTS

| | | | | |
|---|---|---|---|---|
| JP | 2013-522766 A | 6/2013 | | |
| WO | WO 2012102690 A1 * | 8/2012 | .............. | G02B 5/208 |
| WO | WO-2012102690 A1 * | 8/2012 | .............. | G02B 5/208 |
| WO | WO 2014201631 A1 * | 12/2014 | .......... | G06F 3/03545 |
| WO | WO-2014201631 A1 * | 12/2014 | ............ | G06F 40/103 |

* cited by examiner

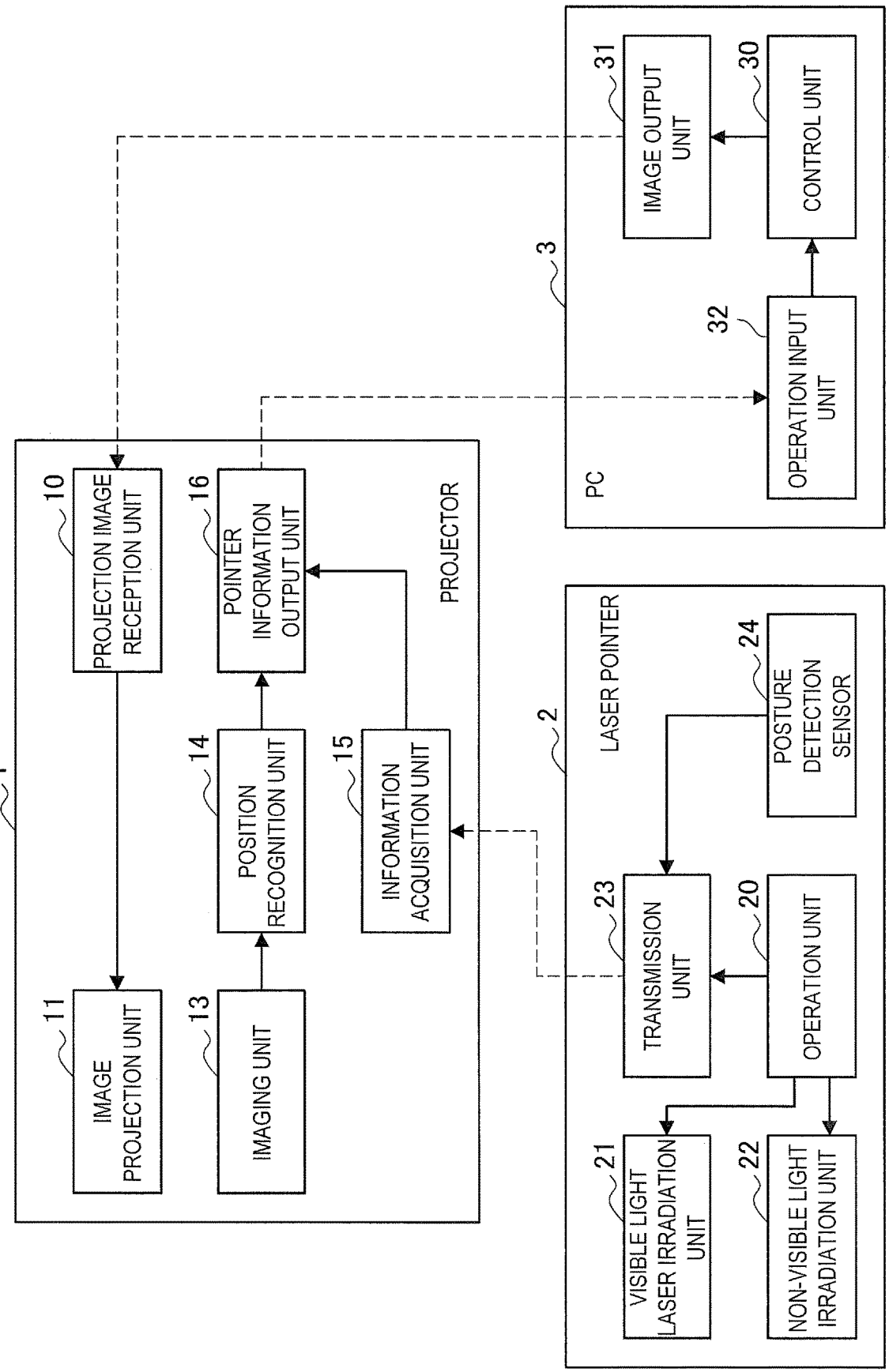

FIG. 21
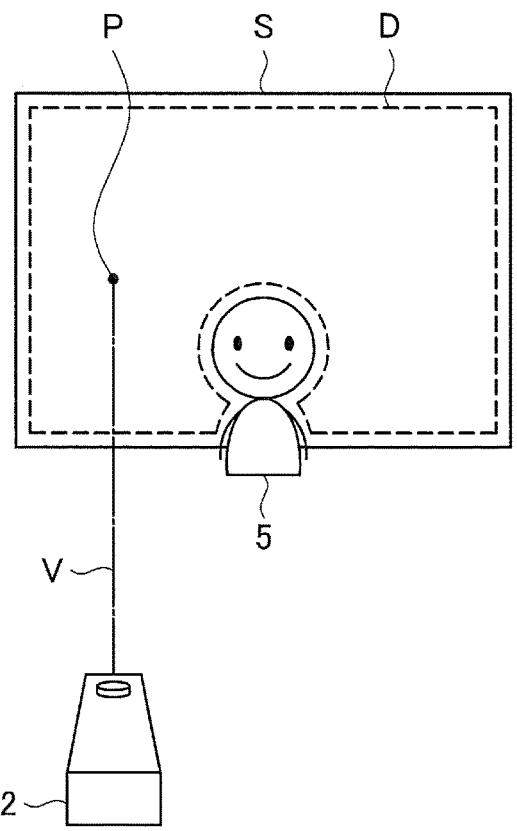
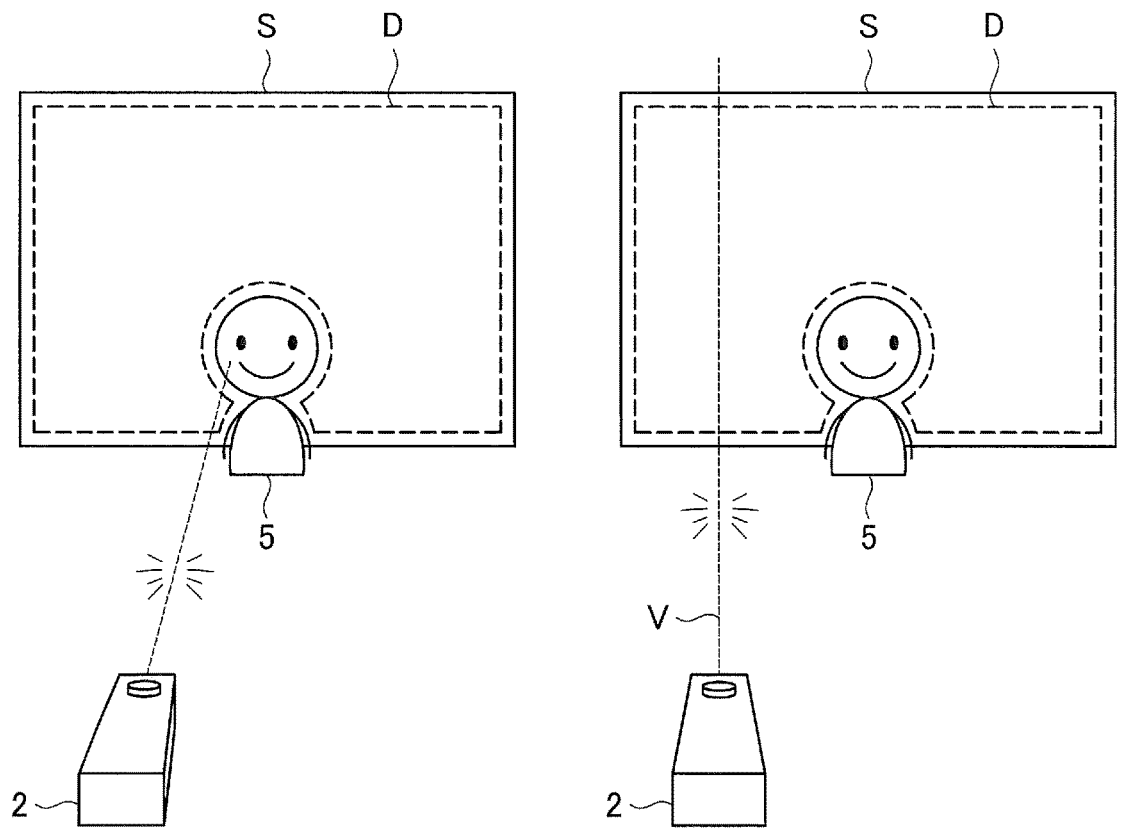

INFORMATION PROCESSING APPARATUS, CONTROL METHOD, AND STORAGE MEDIUM

TECHNICAL FIELD

The present disclosure relates to an information processing apparatus, a control method, a program, and a storage medium.

BACKGROUND ART

Projectors which can display images projected on a large-sized screen are used in various situations, such as for meetings or presentations in companies or for classes in schools. Further, it is well known that laser pointers which project laser light on a projection image are used when describing an image magnified and projected by a projector. In recent years, technologies for using laser pointers, which have such a function for projecting laser light, in UI operations of a projector have been proposed such as follows.

For example, Patent Literature 1 discloses a control system which recognizes movements of a laser pointer, by calculating a difference of captured image data capturing a projection image surface with projection image data, and executes commands associated with prescribed movements of the laser pointer. Specifically, in the case where a pointer irradiated by a laser pointer moves so as to form a right arrow, such a control system will perform a control so as to execute an associated display command such as "proceed to the next slide".

Further, Patent Literature 2 presents a determination system for correctly detecting an indicated position of a laser pointer on a projection image by a projector, even in the case where the brightness of a screen installation location changes. Specifically, such a determination system sets a pointer position determination threshold value prior to starting projection, calculates image data of a difference between captured image data of the present frame and captured image data of the previous frame, and determines an image position exceeding the threshold value as an irradiation position by the laser pointer.

CITATION LIST

Patent Literature

Patent Literature 1: JP 2001-125738A
Patent Literature 2: JP 2008-15560A

SUMMARY OF INVENTION

Technical Problem

However, in the above described Patent Literatures 1 and 2, the coordinates of an irradiation position of laser light by a laser pointer are only recognized based on a captured image. In order to perform a click operation, a drag operation or the like for a projection image, it may be necessary to operate an input device such as a mouse connected to a computer transmitting projection image data to a projector, and it will be difficult to use in a condition where a speaker (user) is performing a description by standing in the vicinity of a screen. Further, in the case where a display signal of a display screen of a computer is transmitted and projected on a projector, when an operation is performed which causes a cursor to be moved on the screen via an input device such as a mouse, a process delay will be generated, and it may be necessary for a user to perform the operation by allowing a delay. That is, the process delay is a process delay generated in each of a detection process in an input device such as a mouse, an internal process in a computer, and a display process to a display.

Accordingly, the present disclosure proposes a new and improved information processing apparatus, control method, program, and storage medium capable of intuitively performing an operation input to an object within a projection image by moving a laser pointer.

Solution to Problem

According to the present disclosure, there is provided an information processing apparatus including: a recognition unit which recognizes an irradiation position of laser light by a laser pointer to a projection image; an acquisition unit which acquires movement information of the laser pointer; and an output unit which outputs a control signal for causing display of an object within a projection image corresponding to the irradiation position to be changed in accordance with the movement information.

According to the present disclosure, there is provided an control method including: a step of recognizing an irradiation position of laser light by a laser pointer to a projection image; a step of acquiring movement information of the laser pointer; and a step of outputting a control signal for causing display of an object within a projection image corresponding to the irradiation position to be changed in accordance with the movement information.

According to the present disclosure, there is provided a program for causing a computer to function as: a recognition unit which recognizes an irradiation position of laser light by a laser pointer to a projection image; an acquisition unit which acquires movement information of the laser pointer; and an output unit which outputs a control signal for causing display of an object within a projection image corresponding to the irradiation position to be changed in accordance with the movement information.

According to the present disclosure, there is provided a storage medium having a program stored therein, the program causing a computer to function as: a recognition unit which recognizes an irradiation position of laser light by a laser pointer to a projection image; an acquisition unit which acquires movement information of the laser pointer; and an output unit which outputs a control signal for causing display of an object within a projection image corresponding to the irradiation position to be changed in accordance with the movement information.

Advantageous Effects of Invention

According to the present embodiment such as described above, it becomes possible to intuitively perform an operation input to an object within a projection image by moving a laser pointer.

BRIEF DESCRIPTION OF DRAWINGS

FIG. 6 is a block diagram which shows an example of an internal configuration of the operation system according to the present embodiment.

FIG. 21 is a figure for describing an irradiation capable region.

DESCRIPTION OF EMBODIMENTS

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will be given in the following order.

1. Outline of the operation system according to an embodiment of the present disclosure
2. System configuration examples
2-1. First system configuration example
2-2. Second system configuration example
2-3. Third system configuration example
3. Internal configuration and operation processes
3-1. Internal configuration
3-2. Operation processes
4. Operation input examples by a laser pointer
4-1. Operation input by a track of an irradiation position
4-2. Operation input corresponding to a movement
5. Modified example
5-1. System configuration
5-2. Internal configuration
6. Supplemental Remarks
7. Summary

1. OUTLINE OF THE OPERATION SYSTEM ACCORDING TO AN EMBODIMENT OF THE PRESENT DISCLOSURE

Figure 1:
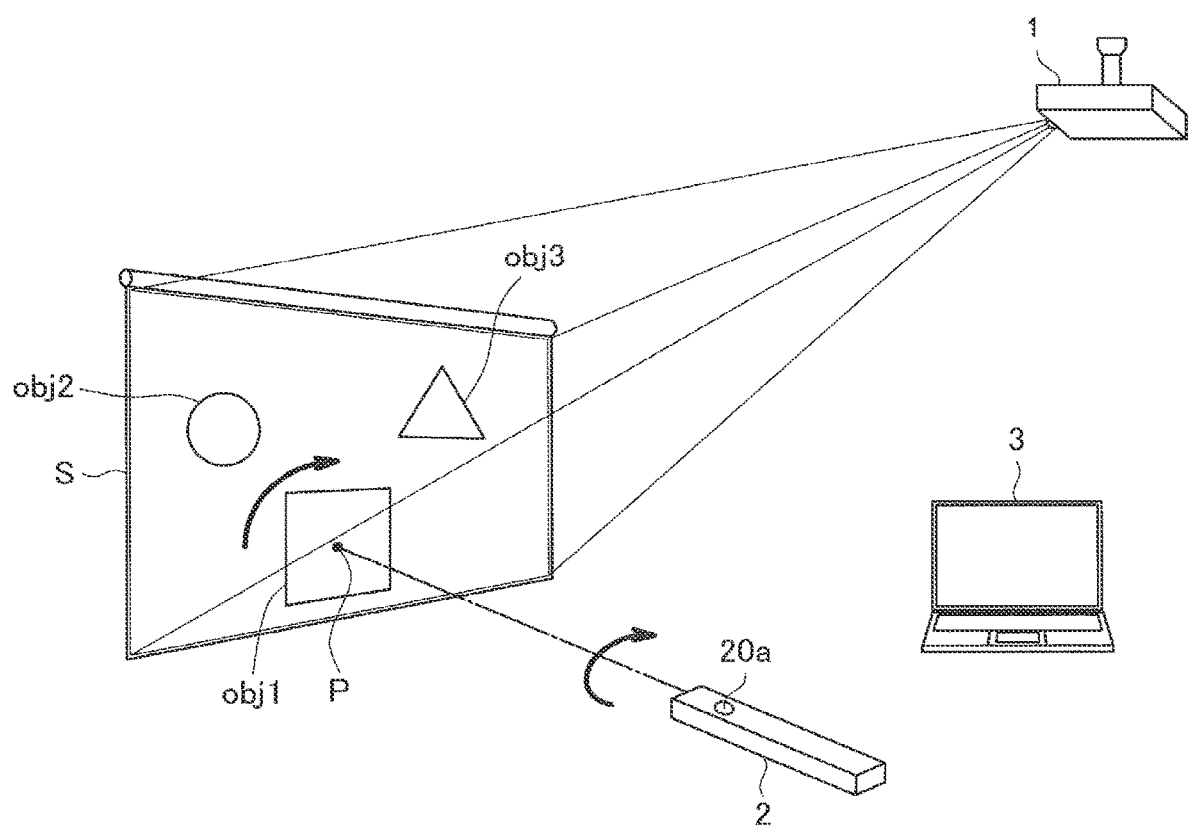
FIG. 1 is a figure for describing an outline of an operation system according to an embodiment of the present disclosure.

First, an outline of an operation system according to an embodiment of the present disclosure will be described by referring to FIG. 1. As shown in FIG. 1, the operation system according to an embodiment of the present disclosure includes a projector 1, a laser pointer 2, and a personal computer (PC) 3 which outputs a content for projection to the projector 1. The content for projection is a diagram, text, another type of graphic image, a map, a website, a 3D object or the like, and is hereinafter called image data for projection.

The projector 1 projects image data (a display signal) received from the PC 3 on a photographic screen or a wall (hereinafter, a screen S will be used as an example) in accordance with a control signal from the PC 3. Objects obj 1 to 3 capable of an editing operation, for example, are included in a projection image projected on the screen S.

The laser pointer 2 has a function which irradiates laser light of visible light, in accordance with a pressing operation of an operation button 20a by a user (speaker). The user can perform a presentation while performing an instruction by matching an irradiation position P to a description location, by irradiating laser light on an image projected on the screen S, by using the laser pointer 2.

The PC 3 electronically generates an image for projection, transmits image data to the projector 1 by wires/wirelessly, and performs a projection control. While a notebook-type PC is shown in FIG. 1 as an example, the PC 3 according to the present embodiment is not limited to a notebook-type PC, and may be a desktop-type PC, or a server on a network (cloud).

(Background)

Here, as described above, in the above described Patent Literatures 1 and 2, the coordinates of an irradiation position of laser light by a laser pointer are only recognized based on a captured image in which a projection image is captured. Therefore, an operation input is not able to be performed to the objects obj 1 to 3 capable of editing within a projection image by using a laser pointer, and it may be necessary to operate an input device (a mouse, touch pad, keyboard or the like) of the PC 3, in order to move the objects obj 1 to 3.

Accordingly, it has reached creating the operation system according to each of the embodiments of the present disclosure by focusing on the above mentioned circumstances. The operation system according to each of the embodiments of the present disclosure can intuitively perform an operation input to an object within a projection image by moving a laser pointer. Specifically, as shown in FIG. 1, for example, an object to be an operation target is determined to be the object obj 1 by pressing the operation button 20a of the laser pointer 2, and thereafter the object obj 1 can be rotationally operated, by causing the laser pointer 2 to be rotated. Hereinafter, a system configuration example of the operation system according to an embodiment of the present disclosure will be specifically described.

2. SYSTEM CONFIGURATION EXAMPLES

2-1. First System Configuration Example

Figure 2:
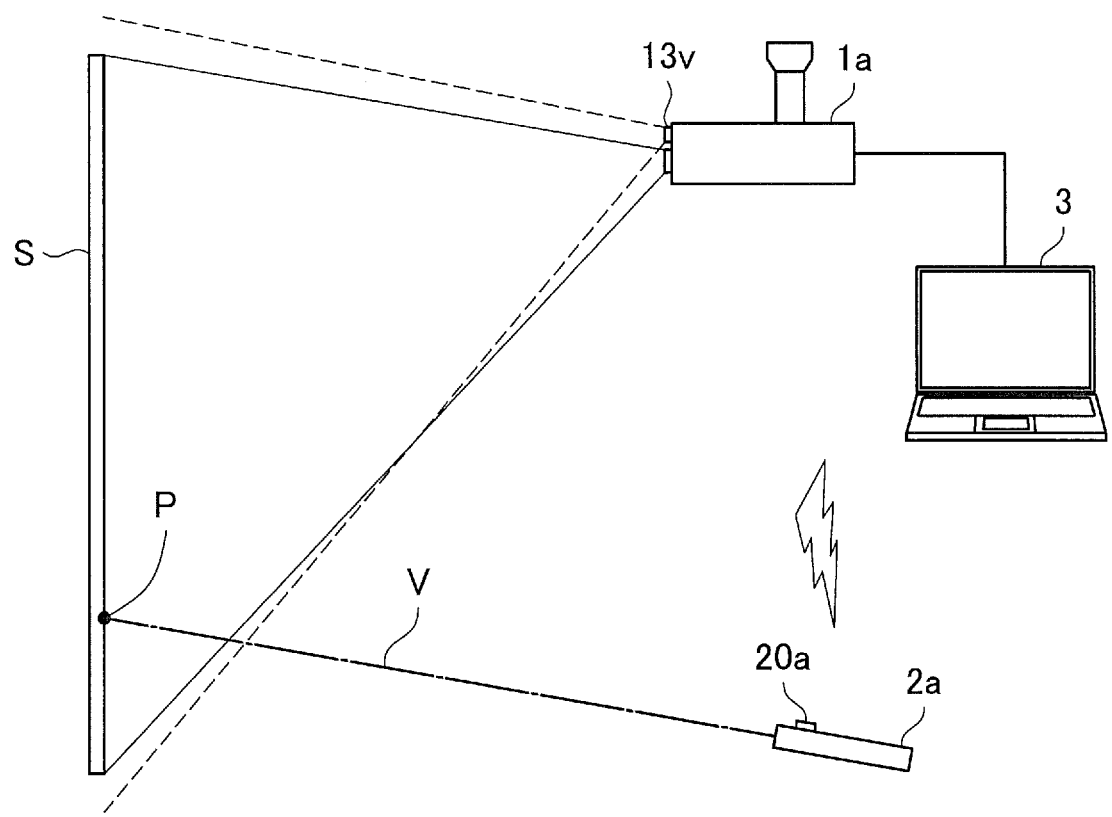
FIG. 2 is a figure for describing a first system configuration example of the operation system according to an embodiment of the present disclosure.

FIG. 2 is a figure for describing a first system configuration example of the operation system according to an embodiment of the present disclosure. As shown in FIG. 2, the first system configuration example is formed by a projector 1, a laser pointer 2 (an information processing apparatus according to the present disclosure), and a PC 3.

The projector 1 according to the present embodiment is connected by wires/wirelessly to the PC 3, and projects an image on the screen S, based on image data for projection (a display signal) received from the PC 3. Further, the projector 1 has a visible light imaging unit 13v for recognizing an irradiation position P of laser light V of visible light by the laser pointer 2 on a projection image. The visible light imaging unit 13v may be built into the projector 1, or may be externally attached.

Further, by being provided in the projector 1, the visible light imaging unit 13v can automatically perform calibration of the range of a projection image which is an imaging target. Specifically, the visible light imaging unit 13v can change the imaging range or the imaging direction in conjunction with the projection direction by the projector 1. Note that, by having the visible light imaging unit 13v capture an area of a range wider than a range of a projection image, laser irradiation to a range outside that of the projection image (an outer side of the screen) can also be used for a UI operation.

The laser pointer 2 irradiates laser light V of a visible light ray visible to human eyes, in accordance with the pressing of the operation button 20a provided in the laser pointer 2. The laser pointer 2 is used for a user to indicate an arbitrary position on a projection image by the laser light V. Specifically, in the case where the operation button 20a has been half-pressed (an example of an irradiation indication operation), the laser pointer 2 irradiates the laser light V. Note that, other than the laser light V of a visible light ray, the laser pointer 2 according to the present embodiment may irradiate a marker image of visible light (hereinafter, also called a visible light marker). The visible light marker is, for example, an arbitrary shape (a cross-type, a heart-type or the like), or a one-dimensional/two-dimensional bar code in which information such as a user ID is embedded. Further, the visible light marker is not limited to a still image, and may be a moving image in which the color or shape changes.

Further, in the case where the operation button 20a is fully-pressed (an example of a determination operation), the laser pointer 2 transmits information which shows that a determination operation is detected (hereinafter, also called determination operation information) to the projector 1 by wireless communication, while continuing irradiation of the laser light V. Here, the fully-pressing operation of the operation button 20a is an example of a determination operation for determining an object within a projection image as an operation target. A user holds the laser pointer 2 in his or her hand and faces towards the screen, causes laser light V to be irradiated by half-pressing the operation button 20a, and determinates an irradiation position P as an operation target by fully-pressing the operation button 20a at the time when matched with an arbitrary object from among the objects within the projection image.

In addition, by causing the laser pointer 2 to be moved, a user can perform an intuitive operation input to a determined object. Specifically, by moving the laser pointer 2 in a vertical/horizontal movement, a rotation movement, or a pan direction/tilt direction, to a projection image of the screen S, a user can perform an operation input corresponding to a movement of the laser pointer 2 to an object within the projection image. For example, as shown in FIG. 1, by causing the laser pointer 2 to be rotated, an object obj 1 determined as an operation target can be rotationally operated. Such movement information of the laser pointer 2 is detected by various types of sensors such as a gyro sensor, an acceleration sensor and a geomagnetic sensor provided in the laser pointer 2, and is transmitted to the projector 1 by wireless communication.

The laser light V irradiated by the laser pointer 2 is captured by the visible light imaging unit 13v provided in the projector 1, and position coordinates of an irradiation position P are recognized in the projector 1. Further, at the time when determination operation information has been transmitted from the laser pointer 2, the projector 1 determines an object within the projection image, which is positioned at a coordinate position of the irradiation position P, as an operation target.

Further, the projector 1 receives movement information of the laser pointer 2 from the laser pointer 2. Then, the projector 1 transmits (outputs), to the PC 3, a control signal (hereinafter, also called pointer information) for causing display of the object determined as an operation target to be changed in accordance with the movement information received from the laser pointer 2.

The PC 3 executes a display change process for the object in accordance with the control signal (pointer information) received from the projector 1, and transmits image data after execution to the projector 1.

In this way, according to the first system configuration example shown in FIG. 2, it becomes possible to have an intuitive operation input corresponding to a movement of the laser pointer 2 to an arbitrary object within a projection image using the laser pointer 2.

2-2. Second System Configuration Example

Figure 3:
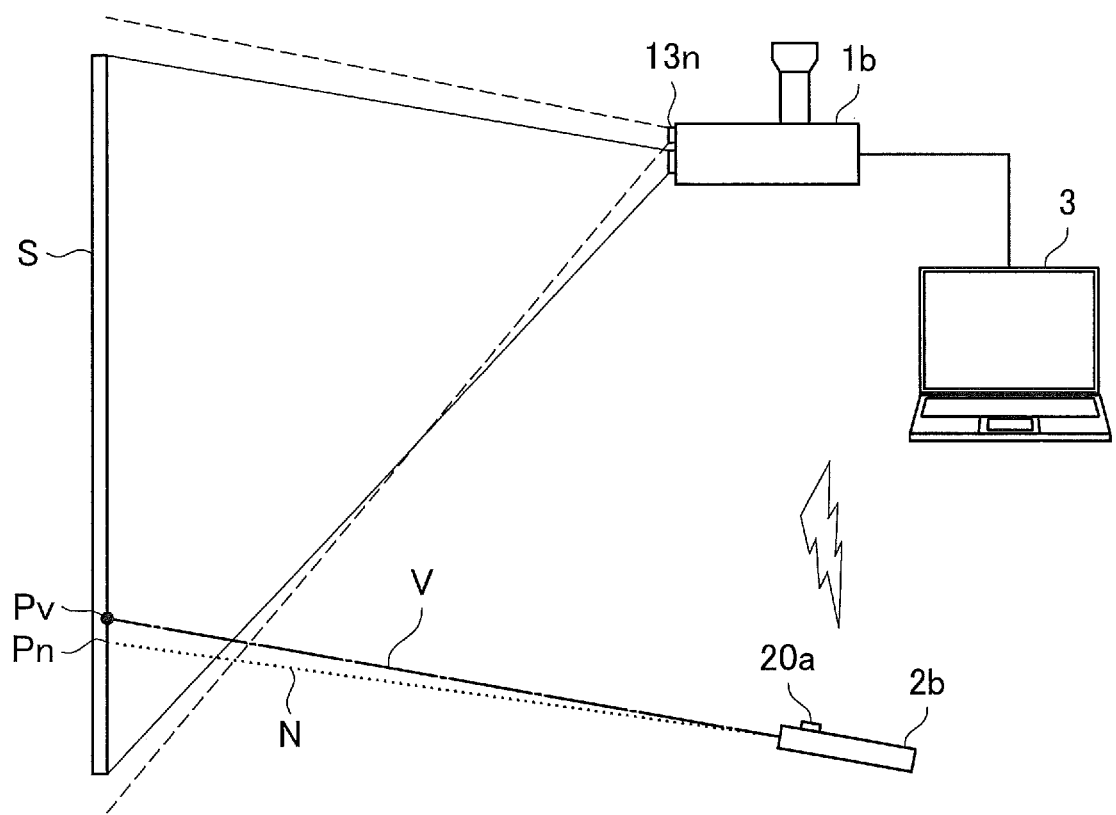
FIG. 3 is a figure for describing a second system configuration example of the operation system according to an embodiment of the present disclosure.

Next, a second system configuration example of the operation system according to an embodiment of the present disclosure will be described by referring to FIG. 3. FIG. 3 is a figure for describing a second system configuration example of the operation system according to an embodiment of the present disclosure. As shown in FIG. 3, the second system configuration of the operation system is formed from a projector 1b (an information processing apparatus according to the present disclosure), a laser pointer 2b, and a PC 3.

Here, while a description has been made in the above described first system configuration example for the case where laser light V of visible light is irradiated from the laser pointer 2, the laser light irradiated from the laser pointer 2 according to the present embodiment is not limited to visible light, and laser light of non-visible light, for example, may be irradiated.

For example, as shown in FIG. 3, the laser pointer 2b irradiates laser light V of visible light, and laser light N of non-visible light such an infrared light ray not visible to human eyes, in accordance with an operation of the operation button 20a. Specifically, for example, in the case where the operation button 20a has been half-pressed, the laser light V of visible light is irradiated, and in the case where the operation button 20a has been further pressed (in the case of being fully-pressed), the laser light N of non-visible light is irradiated, while continuing irradiation of the laser light V of visible light.

In this case, a speaker or an audience visually recognizes an irradiation position Pv indicated by the laser light V of visible light, and the projector 1b recognizes an irradiation position Pn indicated by the laser light N of non-visible light based on a non-visible light captured image in which a projection image is captured by the non-visible light imaging unit 13n provided in the projector 1b. Note that, the irradiation position Pn by the laser light N of non-visible light is positioned at a same position as, or in the vicinity of, the irradiation position Pv of the laser light V.

In this way, according to the second system configuration example, the projector 1b (an information processing apparatus according to the present disclosure) can recognize an irradiation position Pn of the laser light N of non-visible light irradiated from the laser pointer 2b.

Further, in the second system configuration example, similar to the first system configuration example, determination operation information detected by the laser pointer 2b (for example, fully-pressing operation information of the operation button 20a) is transmitted to the projector 1b. The projector 1b determines an object indicated by the laser light N on a projection image (an object within a projection image positioned at a coordinate position of the irradiation position Pn), at the time of receiving determination operation information, as an object of an operation target.

Further, the laser pointer 2b performs transmission to the projector 1b, similar to the first system configuration example related to movement information (a vertical/horizontal movement, a rotation movement, or a tilt/pan operation) detected by a gyro sensor or the like provided in the laser pointer 2b.

Then, similar to the projector 1 included in the first system configuration example, the projector 1b transmits (outputs), to the PC 3, a control signal (pointer information) for causing display of the object determined as an operation target to be changed in accordance with movement information received from the laser pointer 2b.

In this way, in the second system configuration example shown in FIG. 3, it becomes possible to have an intuitive operation input corresponding to a movement of the laser pointer 2b to an arbitrary object within a projection image using the laser pointer 2b, which irradiates laser light N of non-visible light.

2-3. Third System Configuration Example

Figure 4:
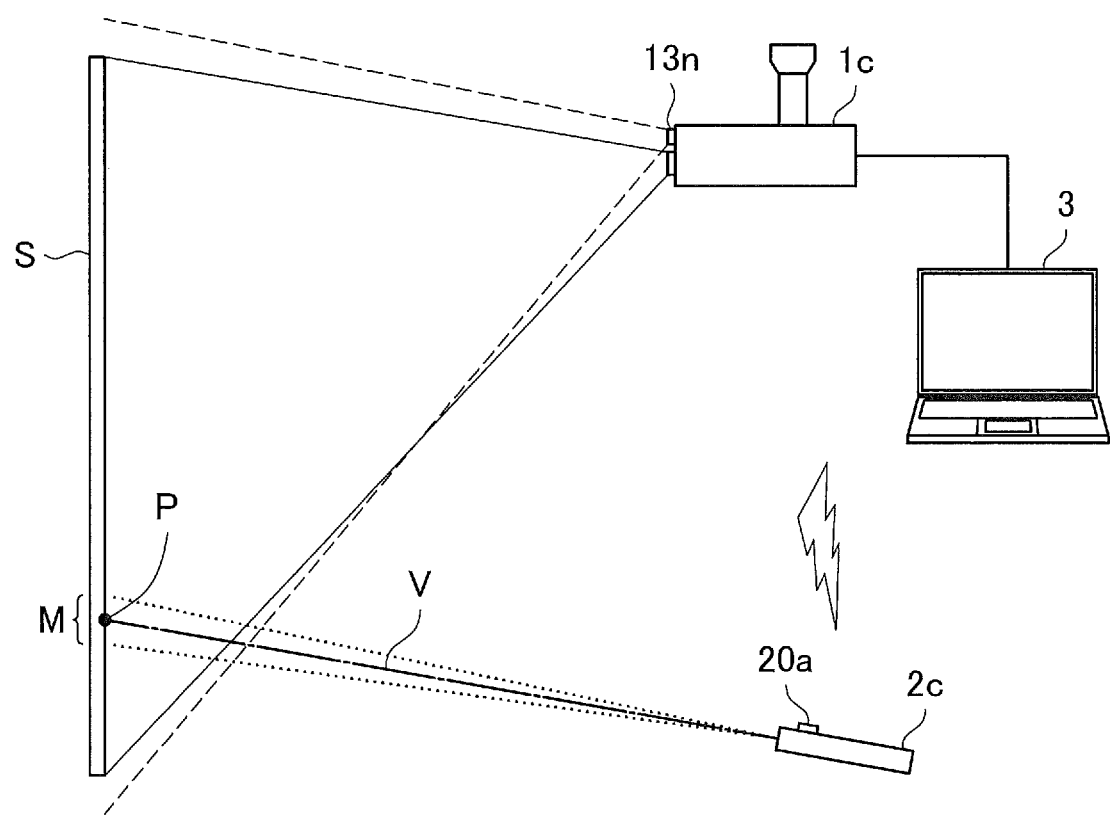
FIG. 4 is a figure for describing a third system configuration example of the operation system according to an embodiment of the present disclosure.

Next, a third system configuration example of the operation system according to an embodiment of the present disclosure will be described by referring to FIG. 4. FIG. 4 is a figure for describing a third system configuration example of the operation system according to an embodiment of the present disclosure. As shown in FIG. 4, the third system configuration of the operation system is formed from a projector 1c (an information processing apparatus according to the present disclosure), a laser pointer 2c, and a PC 3.

Here, in the above described first and second system configuration examples, while the projectors 1 and 1b receive (acquire) movement information of the laser pointers 2 and 2b by wireless communication, the acquisition method of movement information according to the present embodiment is not limited to this, and acquisition may be performed, for example, based on a non-visible light marker M irradiated from the laser pointer 2b.

As shown in FIG. 4, for example, the laser pointer 2c irradiates laser light V of visible light, and a non-visible light marker M such as an infrared light ray not visible to human eyes, in accordance with an operation of the operation button 20a. Specifically, for example, in the case where the operation button 20a has been half-pressed, the laser light V of visible light is irradiated, and in the case where the operation button 20a has been further pressed (in the case of being fully-pressed), the non-visible light marker M is irradiated, while continuing irradiation of the laser light V of visible light.

In this case, a speaker or an audience visually recognizes an irradiation position P indicated by the laser light V of visible light, and the projector 1c recognizes position coordinates (an irradiation position) of the non-visible light marker M based on a non-visible light captured image in which a projection image is captured by the non-visible light imaging unit 13n provided in the projector 1c. Note that, the irradiation position of the non-visible light marker M is positioned at the same position as, or in the vicinity of, the irradiation position P of the laser light V.

Further, the non-visible light marker M is an image having an area, such as an arbitrary shape (a cross-type, a heart-type or the like), or a one-dimensional/two-dimensional bar code in which information such as a user ID is embedded, for example. By analyzing the shape, size, inclination, distortion or the like of the non-visible light marker M, the projector 1c can recognize a position facing a projection image of the laser pointer 2c, and by continuously analyzing further changes of the shape, size, distortion or the like of the non-visible light marker M, can acquire movement information of the laser pointer 2c. Note that, the non-visible light marker M is not limited to a still image, and may be a moving image in which the color or shape changes.

Further, in the third system configuration example, similar to the first and second system configuration examples, determination operation information detected by the laser pointer 2c (for example, fully-pressing operation information of the operation button 20a) is transmitted to the projector 1c. The projector 1c determines an object indicated by the non-visible light marker M on a projection image, at the time of receiving determination operation information, as an object of an operation target.

Then, similar to the projectors 1 and 1b included in the first and second system configuration examples, the projector 1c transmits (outputs), to the PC 3, a control signal (pointer information) for causing display of the object determined as an operation target to be changed in accordance with movement information of the laser pointer 2c.

In this way, in the third system configuration example shown in FIG. 4, it becomes possible to have an intuitive operation input corresponding to a movement of the laser pointer 2c to an arbitrary object within a projection image using the laser pointer 2c, which irradiates a non-visible light marker M.

Heretofore, the first to third system configuration examples of the operation system according to the present embodiment have been described. Hereinafter, in the case where it may not be necessary to individually describe the projectors 1 to 1c, they will be collectively called a projector 1. Further, similarly, in the case where it may not be necessary to individually describe the laser pointers 2 to 2c, they will be collectively called a laser pointer 2.

The operation unit of the laser pointer 2 according to the present embodiment is not limited to a configuration in which user operations of a plurality of stages (half-pressing, fully-pressing) can be detected by one operation button 20a such as shown in FIG. 2 to FIG. 4, and may be a configuration which detects user operations of a plurality of stages, for example, by a plurality of buttons. For example, operation buttons are respectively provided on a housing upper surface and lower surface of the laser pointer 2, and in the case where the operation button of the upper surface has been pressed, a user operation of a first stage (corresponding to the above described half-pressing operation) is detected, and in the case where the operation button of the lower surface has also been further pressed, a user operation of a second stage (corresponding to the above described fully-pressing operation) is detected. In this way, the laser pointer 2 can detect user operations of two stages at a stage where one button is pressed (a first stage) and a stage where two are simultaneously pressed (a second stage).

Further, the operation unit provided in the laser pointer 2 is not limited to a button by a physical structure, and may be implemented by a sensor which detects contact/proximity of a finger. For example, a touch panel is provided as an operation unit on a casing upper surface of the laser pointer 2, and the laser pointer 2 detects user operations of a plurality of stages in accordance with a frequency of contact (a tap frequency) or the like, based on a detection result of contact/proximity of a finger.

Further, the shape of the laser pointer 2 according to the present embodiment is not limited to the rectangular parallelepiped shape shown in FIG. 2 to FIG. 4B, and may be a pointer rod shape or the like in which an irradiation unit has been provided at the tip, for example.

Figure 5A:
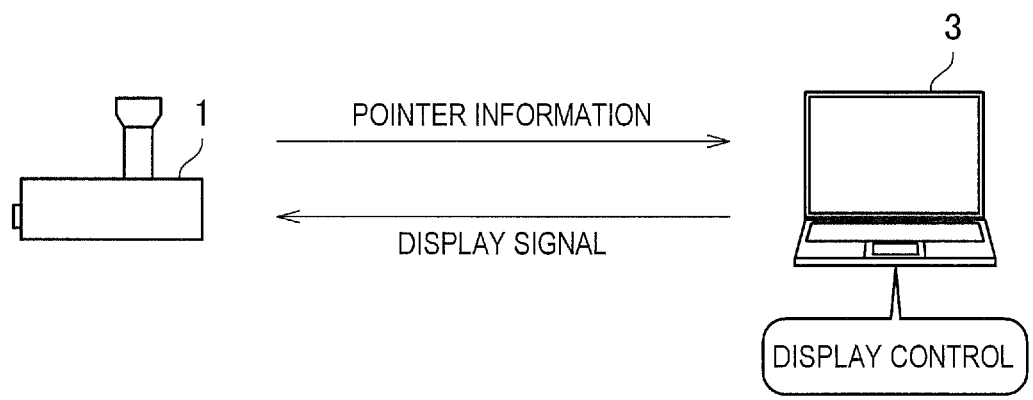
FIG. 5A is a figure for describing a case where a projector receives image data for projection from a PC.

Further, in the above described first to third system configuration examples, such as shown in FIG. 5A, image data for projection (a display signal) is transmitted to the projector 1 from the PC 3, and pointer information (a control signal) is transmitted from the projector 1 to the PC 3. Also, in the PC 3, a display control process is executed in accordance with the pointer information, and image data (a display signal) after execution is transmitted to the projector 1.

Figure 5B:
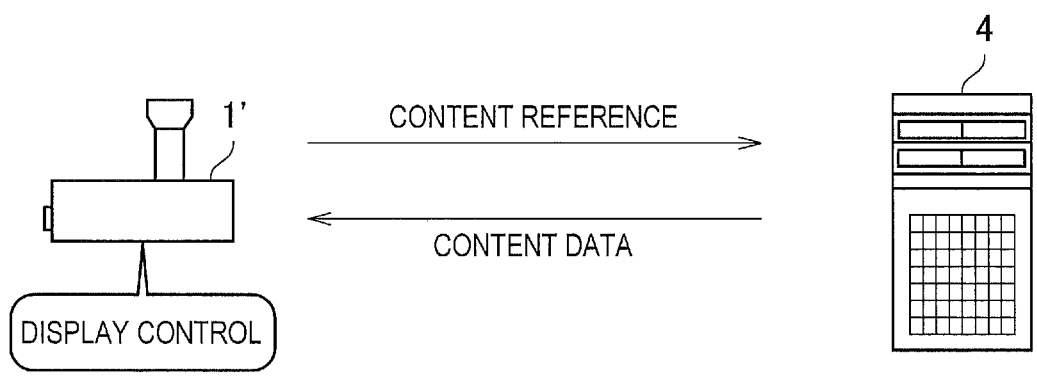
FIG. 5B is a figure for describing a case where a projector acquires a content from on a network.

Therefore, the configuration of the operation system according to the present embodiment is not limited to the example shown in FIG. 5A, and may be a configuration in which a projector 1' which includes the functions of the above described PC 3, for example, acquires content data (a photograph, moving image, game, website or the like) from a content server 4 on a network (cloud) such as shown in FIG. 5B. In this case, the projector 1' generates a display signal (image data for projection) based on the acquired content data, and performs a projection control. Further, the projector 1' executes a display control process in accordance with pointer information, and projects image data after execution.

3. INTERNAL CONFIGURATION AND OPERATION PROCESSES

To continue, an internal configuration and the operation processes of the operation system according to the present embodiment will be described by referring to FIG. 6 and FIG. 7.

3-1. Internal Configuration

FIG. 6 is a block diagram which shows an example of an internal configuration of the operation system according to the present embodiment.

(Projector 1)

As shown in FIG. 6, the projector 1 has a projection image reception unit 10, an image projection unit 11, an imaging unit 13, a position recognition unit 14, an information acquisition unit 15, and a pointer information output unit 16.

The projection image reception unit 10 receives image data for projection by wires/wirelessly from the PC 3, and outputs the received image data to the image projection unit 11.

The image projection unit 11 image-projects (projects) the image data sent from the image projection unit 11 on an image-projection screen or a wall.

The imaging unit 13 captures the projection image projected on a screen S, and outputs a captured image to the position recognition unit 14. The imaging unit 13 is implemented by a non-visible light imaging unit 13n which performs non-visible light (invisible light) imaging such as infrared light ray camera or an ultraviolet light ray camera, or a visible light imaging unit 13v which performs visible light imaging.

The position recognition unit 14 functions as a recognition unit which recognizes an irradiation position Pv of visible light laser light V, an irradiation position Pn of non-visible light laser light N, or a coordinate position of a non-visible light marker M, by the laser pointer 2 to a projection image, based on a visible light/non-visible light captured image in which a projection image is captured. For example, the position recognition unit 14 detects an irradiation position (position coordinates), by detecting a difference between an image projected by the image projection unit 11 and a visible light/non-visible light captured image in which a projection image is captured. Further, the position recognition unit 14 can increase the accuracy by adding, to an analysis, the difference between a visible light/non-visible light captured image of a frame prior to the image presently projected and a visible light/non-visible light captured image of an image presently projected. The position recognition unit 14 outputs the recognized irradiation position information (position coordinate information) to the pointer information output unit 16.

The information acquisition unit 15 has a function which wirelessly receives determination operation information and/or movement information from the laser pointer 2. While the system of wireless communication between the projector 1 and the laser pointer 2 is not particularly limited, transmission and reception of data is performed, for example, by Wi-Fi (registered trademark), Bluetooth (registered trademark) or the like.

Note that, in the third system configuration example shown in FIG. 4, the information acquisition unit 15 acquires movement information of the laser pointer 2 in accordance with the shape, size, inclination, distortion or the like of the non-visible light marker M, by analyzing a non-visible light captured image captured by the non-visible light imaging unit 13n.

The information acquisition unit 15 outputs the acquired determination operation information and movement information to the pointer information output unit 16.

The pointer information output unit 16 determines an object to be an operation target within a projection image projected from the image projection unit 11, based on determination information output from the information acquisition unit 15 and irradiation position information output from the position recognition unit 14. Then, the pointer information output unit 16 detects a control signal for causing display of the above described determined object to be changed, in accordance with the movement information output from the information acquisition unit 15, as pointer information, and transmits (outputs) this to the PC 3 by wires/wirelessly.

(Laser Pointer 2)

As shown in FIG. 6, the laser pointer 2 has an operation unit 20, a visible light laser irradiation unit 21, a non-visible light irradiation unit 22, a transmission unit 23, and a posture detection sensor 24.

The operation unit 20 has a function which detects user operations of a plurality of stages, and is implemented by a single/plurality of operation buttons or touch panels. For example, in the case where a user operation of a first stage (specifically, a half-pressing operation of the operation button 20a) is detected, the operation unit 20 outputs that an irradiation indication operation has been detected to the visible light laser irradiation unit 21. Further, in the case where a user operation of a second stage (specifically, a fully-pressing operation of the operation button 20a) is detected, the operation unit 20 outputs that a determination operation has been detected to the non-visible light irradiation unit 22 and the transmission unit 23.

The visible light laser irradiation unit 21 has a function which irradiates laser light V of visible light in the case where a user operation of a first stage (an irradiation indication operation) has been detected in the operation unit 20. Further, the irradiation of the laser light V by the visible light laser irradiation unit 21 is also continuously performed in the case where a user operation of a second stage (a determination operation) has been detected in the operation unit 20.

The non-visible light irradiation unit 22 has a function which irradiates laser light N of non-visible light or a non-visible light marker M (also called a non-visible light image) in the case where a user operation of a second stage (a determination operation) has been detected in the operation unit 20. The irradiation of non-visible light by the non-visible light irradiation unit 22 is irradiated at a same position as, or in the vicinity of, an irradiation position Pv of the laser light V of visible light irradiated by the visible light laser irradiation unit 21.

Note that, in the case where a user operation of a first stage (an irradiation indication operation) has been detected in the operation unit 20, the non-visible light irradiation unit 22 according to the present embodiment may irradiate the non-visible light marker M by a one-dimensional/two-dimensional bar code in which information such as a user ID is embedded.

The transmission unit 23 has a function which wirelessly transmits determination operation information to the projector 1 in the case where a user operation of a second stage (a determination operation) has been detected in the operation unit 20. Further, the transmission unit 23 continuously wirelessly transmits a detection result output from the posture detection sensor 24, while a user operation of a second stage (a determination operation) is being detected (for example, while the operation button 20a is being fully-pressed), to the projector 1 as movement information.

The posture detection sensor 24 is a detection unit which detects posture information of the laser pointer 2, and is implemented, for example, by a gyro sensor, an acceleration sensor, a geomagnetic sensor or the like. In this way, the laser pointer 2 can acquire an up-down and left-right movement, a rotation movement, or a movement to a pan/tilt direction (movement information) of itself. A detection result of the posture detection sensor 24 is output to the transmission unit 23.

(PC 3)

As shown in FIG. 6, the PC 3 has a control unit 30, an image output unit 31, and an operation input unit 32.

The control unit 30 has a function which controls each of the configurations of the PC 3. Specifically, for example, the control unit 30 executes a display control process in accordance with operation input information (including pointer information transmitted from the projector 1) detected by the operation input unit 32, and outputs (transmits) image data after execution from the image output unit 31 to the projector 1. Specifically, the control unit 30 causes display of an object within a projection image determined as an operation target to be changed in accordance with movement information (an up-down and left-right movement, rotation movement, movement to a pan/tilt direction) of the laser pointer 2. For example, in the case where a movement in which the laser pointer 2 is rotated to the right with respect to the projection image is shown by movement information, the control unit 30 performs a process so as to similarly cause the determined object within the projection image to be rotated to the right.

The operation input unit 32 has a function which accepts an input of a user operation (operation input information) from a keyboard, mouse or the like connected to the PC 3. Further, the operation input unit 32 also functions as a reception unit which receives pointer information (a control signal) from the projector 1 as operation input information. The operation input unit 32 outputs the accepted operation input information to the control unit 30.

The image output unit 31 has a function which transmits image data for projection by wires/wirelessly to the projector 1. The transmission of image data for projection may be continuously performed.

By the configuration described above, in the operation system according to the present embodiment, a user can perform an intuitive operation input corresponding to a movement of the laser pointer 2 to an object within a projection image by using the laser pointer 2.

3-2. Operation Processes

Next, the operation processes of the operation system according to the present embodiment will be described. Here, the operation processes in the first system configuration example will be described, as an example, from among the above described first to third system configuration examples of the operation system according to the present embodiment.

Figure 7:
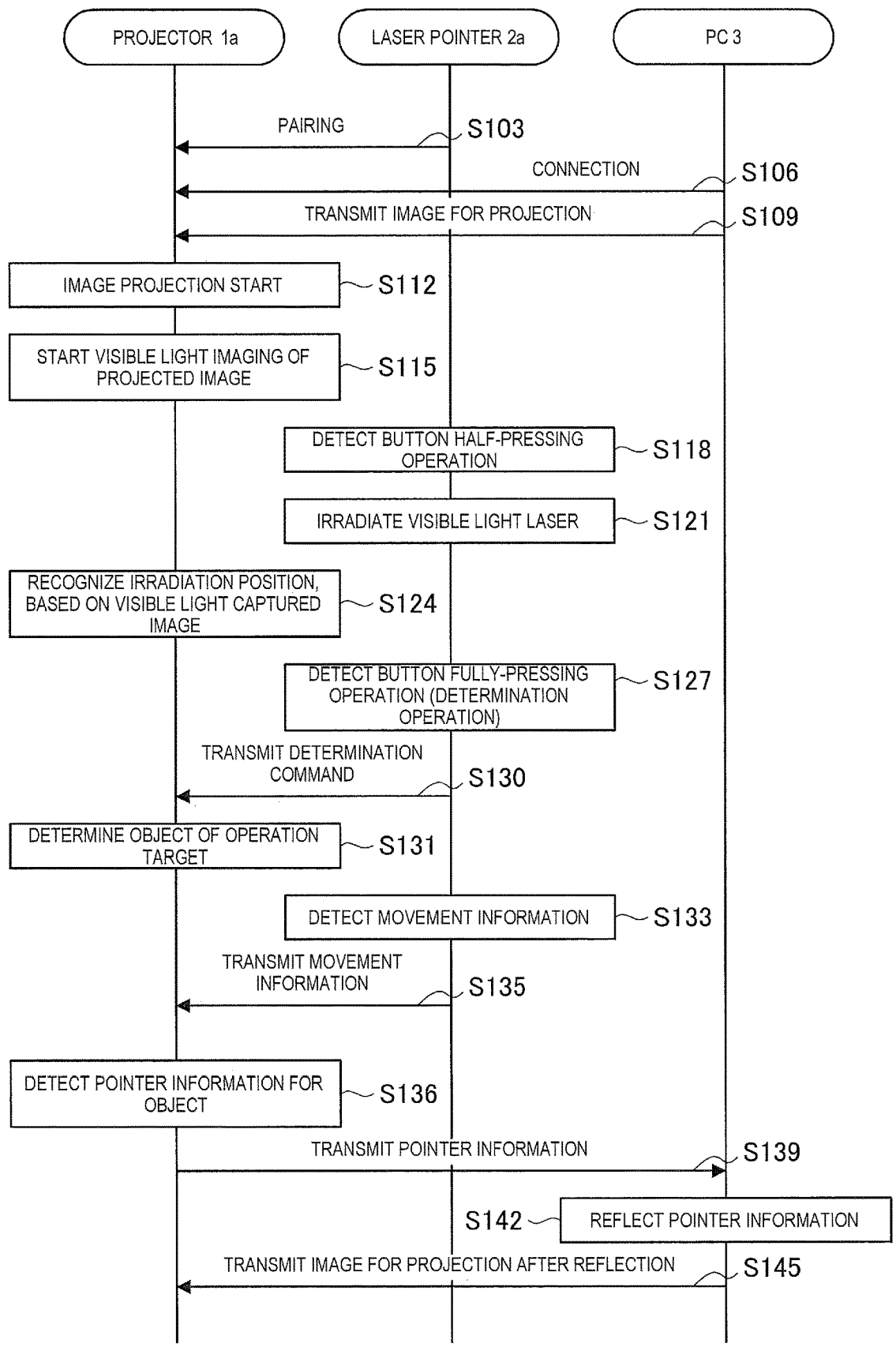
FIG. 7 is a sequence diagram which shows the operation processes of the operation system according to the present embodiment.

FIG. 7 is a sequence diagram which shows the operation processes of the operation system according to the present embodiment. As shown in FIG. 7, first, in step S103, the laser pointer 2a and the projector 1a are automatically or manually paired (a connection setting).

Next, in step S106, the PC 3 and the projector 1 are connected by wires/wirelessly. The connection method is not particularly limited in the present disclosure.

Next, in step S109, the image output unit 31 of the PC 3 transmits image data for projection to the projector 1.

Next, in step S112, the image projection unit 111 of the projector 1a projects the projection image received from the projector 1a by the projection image reception unit 10 on the screen S.

Next, in step S115, the projector 1a starts visible light imaging which sets the range of the projection image by the visible light imaging unit 13v as a target.

On the other hand, in steps S118 and S121, the laser pointer 2a irradiates laser V in accordance with a user operation. Specifically, for example, in the case where the operation button 20a has been half-pressed, the laser pointer 2a irradiates the laser light V by the visible light laser irradiation unit 21. In this way, a user (speaker) can perform a description to an audience while indicating an arbitrary location within the projection image by the laser light V.

Next, in step S124, the position recognition unit 14 of the projector 1a recognizes an irradiation position P (coordinate position) of the laser light V, based on a visible light captured image captured by the visible light imaging unit 13v.

Next, in step S127, the laser pointer 2a detects a determination operation (for example, a fully-pressing operation of the operation button 20a) by the operation unit 20.

To continue, in step S130, the laser pointer 2a wirelessly transmits determination operation information (a determination command) detected by the operation unit 20 to the projector 1a.

Next, in step S131, at the time of receiving the determination operation information from the laser pointer 2a, the pointer information output unit 16 of the projector 1a determines an object within the projection image, which is positioned at a coordinate position of the irradiation position P recognized by the position recognition unit 14, as an operation target.

On the other hand, in step S133, the laser pointer 2a detects a posture of the laser pointer 2a, by the posture detection sensor 24. Specifically, the orientation and inclination, the angular velocity or the like of the laser pointer 2a is detected, by the posture detection sensor 24.

Next, in step S135, the transmission unit 23 of the laser pointer 2a continuously transmits a detection result by the posture detection sensor 24 to the projector 1a as movement information of the laser pointer 2a. Note that, the transmission unit 23 may continuously transmit movement information of the laser pointer 2a, while a determination operation continues to be detected by the operation unit 20.

Next, in step S136, the pointer information output unit 16 of the projector 1a detects pointer information (a control signal) for causing display of the object determined by the above described S131 to be changed in accordance with the movement information received from the laser pointer 2a by the information acquisition unit 15.

To continue, in step S139, the pointer information output unit 16 of the projector 1a transmits the detected pointer information to the PC 3.

Next, in step S142, the control unit 30 of the PC 3 executes a display control process in accordance with the pointer information received from the projector 1a by the operation input unit 32.

Then, in step S145, the image output unit 31 of the PC 3 transmits an image for projection after display control process execution (after the process in accordance with the pointer information) to the projector 1a.

From here onwards, the above described processes shown in S112 to S145 are repeated. Heretofore, an example of the operation processes of the operation system according to the present embodiment has been specifically described by referring to FIG. 7.

4. OPERATION INPUT EXAMPLES BY THE LASER POINTER

To continue, an intuitive operation input using the laser pointer 2 in the transmission system according to the present embodiment will be described by including specific examples. Here, specific examples of an operation input by the laser pointer 2a in the first system configuration example will be described, as an example, from among the above described first to third system configuration examples of the operation system according to the present embodiment.

4-1. Operation Input by a Track of the Irradiation Position

In the operation system according to the present embodiment, other than an operation input corresponding to the above described movement information of the laser pointer 2, it is also possible to perform an operation input based on a track of the irradiation position P. The projector 1a comprehends a track of the irradiation position P by recognizing a change of position of the irradiation position P, based on a visible light captured image captured by the visible light imaging unit 13v, and outputs an indication command associated with a gesture which draws a prescribed track as pointer information. Hereinafter, it will be described by referring to FIG. 8.

FIG. 8 is a figure which shows specific examples of an operation input based on a track of the irradiation position P. As shown in FIG. 8A, for example, in the case where a track is traced on which the irradiation position P draws a circle by the laser light V irradiated by the laser pointer 2a, the projector 1a outputs a determination command as pointer information.

Figure 8A:
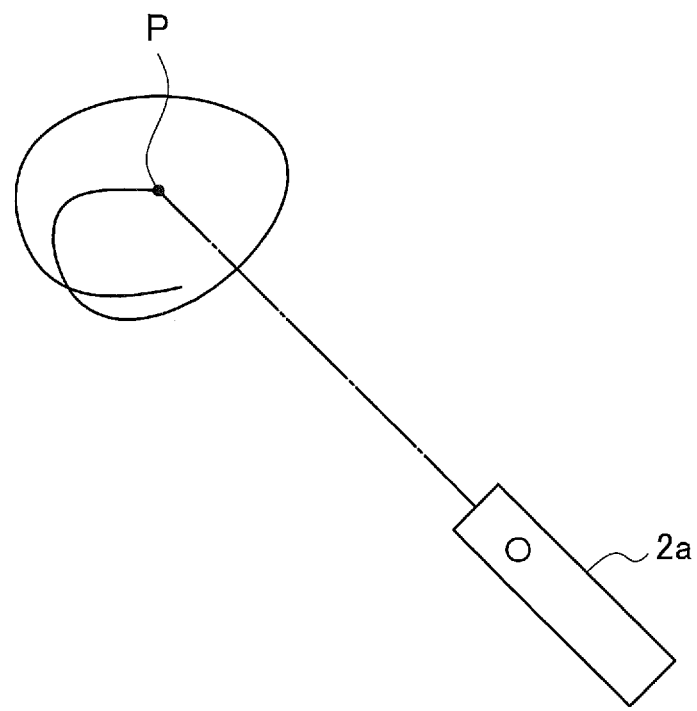
FIG. 8A is a figure for describing an operation input based on a track drawing a circle of an irradiation position.
Figure 8B:
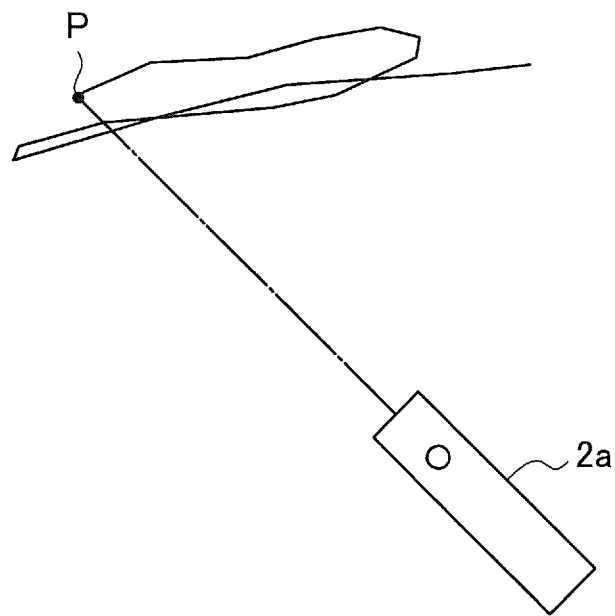
FIG. 8B is a figure for describing an operation input based on a track drawing a horizontal line of an irradiation position.

Further, as shown in FIG. 8B, in the case where a track is traced on which the irradiation position P horizontally draws a line by the laser light V irradiated by the laser pointer 2a, the projector 1a outputs a cancellation or deletion command as pointer information.

Figure 8C:
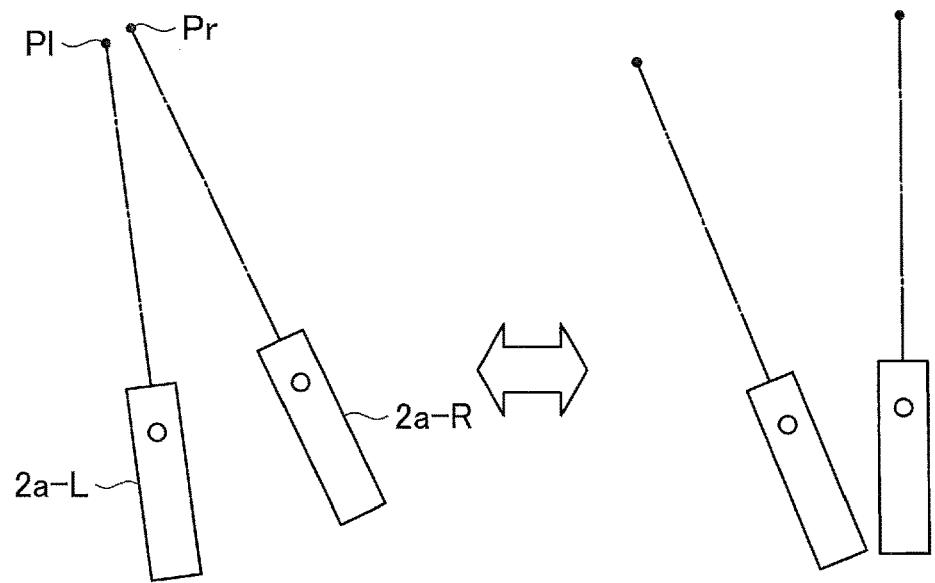
FIG. 8C is a figure for describing an operation input based on a track of a pinch-out/pinch-in by a plurality of irradiation positions.

Further, as shown in FIG. 8C, in the case where a track is traced, by irradiation positions Pr and Pl by two laser pointers 2a-R and 2a-L, of a pinch-out (the irradiation positions Pr and Pl being separating) or a pinch-in (the irradiation positions Pr and Pl approaching), the projector 1a outputs an enlargement or reduction command as pointer information.

Figure 8D:
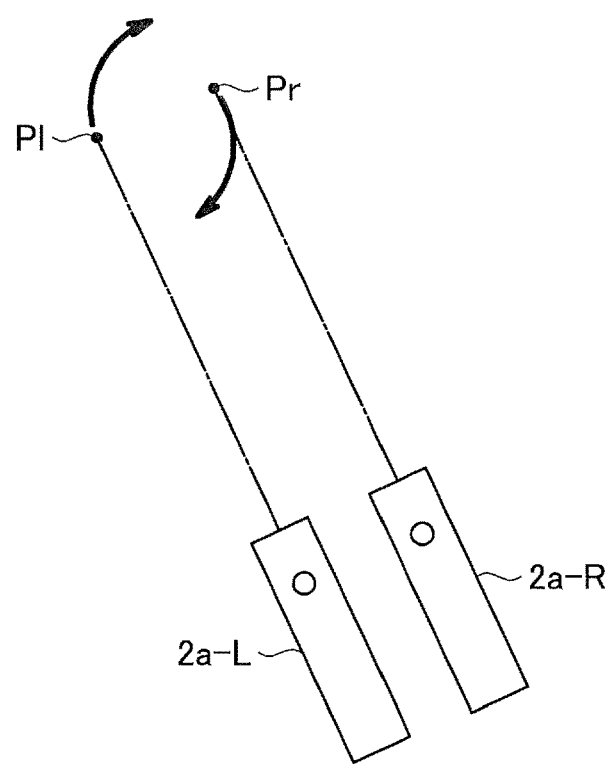
FIG. 8D is a figure for describing an operation input based on a track in which a plurality of irradiation positions are rotated.

Further, as shown in FIG. 8D, in the case where a track is traced, by irradiation positions Pr and Pl by two laser pointers 2a-R and 2a-L, which rotates as it is with a mutually facing position relationship, the projector 1a outputs a rotation command as pointer information.

4-2. Operation Input Corresponding to a Movement

Next, an intuitive operation input using a movement (movement information) of the laser pointer 2a will be specifically described by referring to FIG. 9 to FIG. 14.

Figure 9:
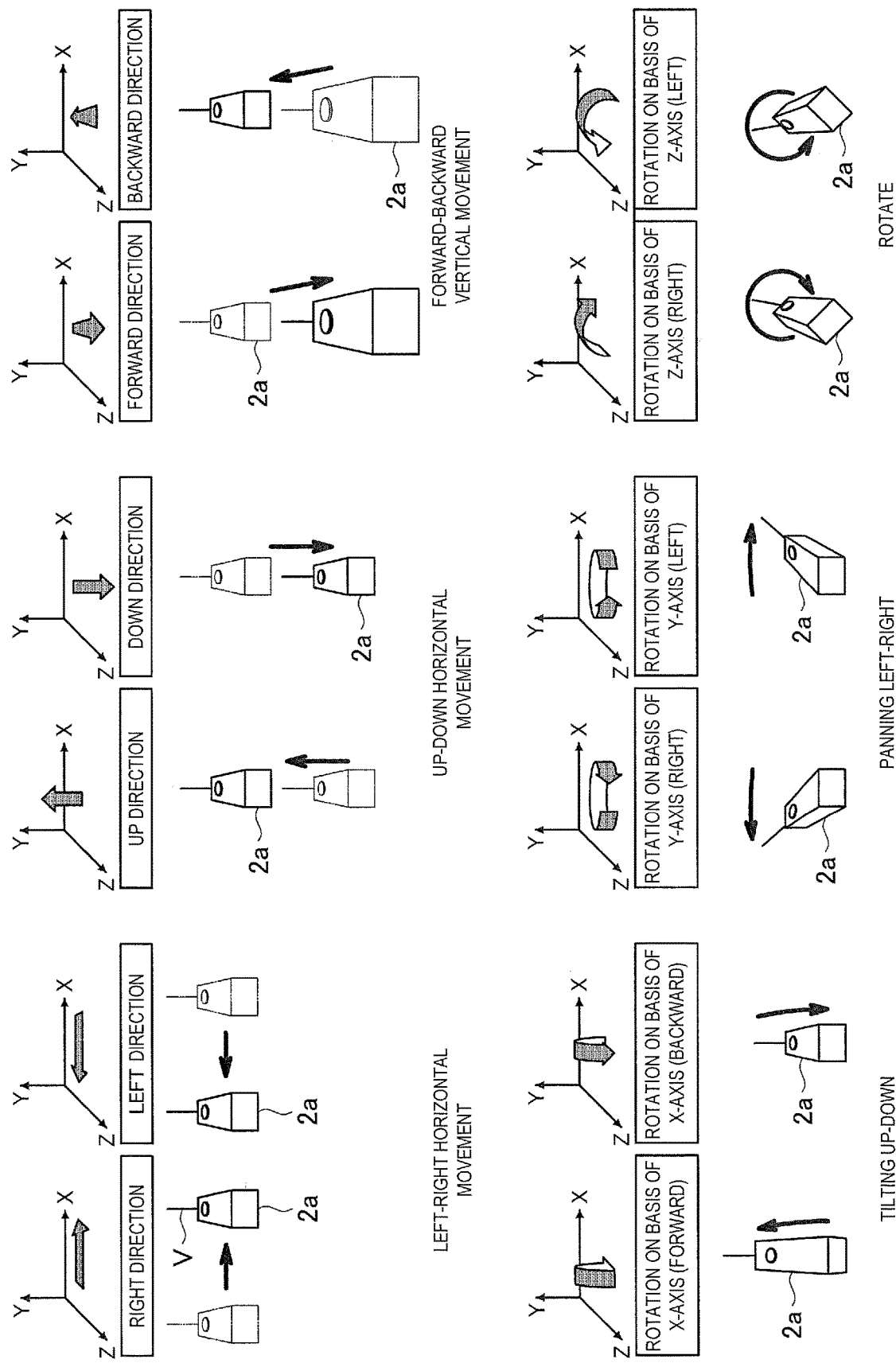
FIG. 9 is a figure for describing the types of movement ways of the laser pointer according to the present embodiment.

FIG. 9 is a figure for describing the types of movement ways of the laser pointer 2a according to the present embodiment. The movement ways of the laser pointer 2a generally have a degree of freedom of movement/rotation with respect to six types of axes.

Specifically, as shown on the top of FIG. 9, it is a left-right horizontal movement which is a translation in an x-direction, an up-down horizontal movement which is a translation in a y-direction, and a forward-backward vertical movement which is a translation in a z-direction, and as shown on the bottom of FIG. 9, it is an up-down tilting movement (swinging in a vertical direction), a left-right panning movement (swinging in a horizontal direction), and a rotation movement.

In the present operation system, a display control process is performed which moves a determined object within a projection image (causes display of the determined object within a projection image to be changed) in accordance with this movement of six degrees of freedom. For example, the object also translates in the x, y and z-directions, by causing the laser pointer 2a to be translated in the x, y and z-directions such as shown on the top of FIG. 9. Further, the object is rotated (pitching) around the x-axis, in accordance with a movement which causes the laser pointer 2a to be tilted up-down such as shown on the bottom of FIG. 9, the object is rotated (yawing) around the y-axis, in accordance with a movement which causes left-right panning, and the object is rotated (rolling) around the z-axis, in accordance with a rotation movement.

In this way, for example, it is also possible to perform a viewpoint control in 3D CAD or 3D CG modelling software. Further, in an input device of two degrees of freedom such as a mouse, there will be complex operations which may be necessary to perform a switching of modes, such as translating with respect to an xy-direction/yz-direction/xz-direction, a yaw-pitch rotation or a roll rotation, by a pressing state of a GUI button, a keyboard operation, a mouse button or the like. However, according to the operation system according to the present embodiment, it becomes possible to modelessly and seamlessly perform these viewpoint position operations.

Hereinafter, operation input examples using a movement of six degrees of freedom of the laser pointer 2a will be described by including specific examples.

(Roll Rotation)

Figure 10:
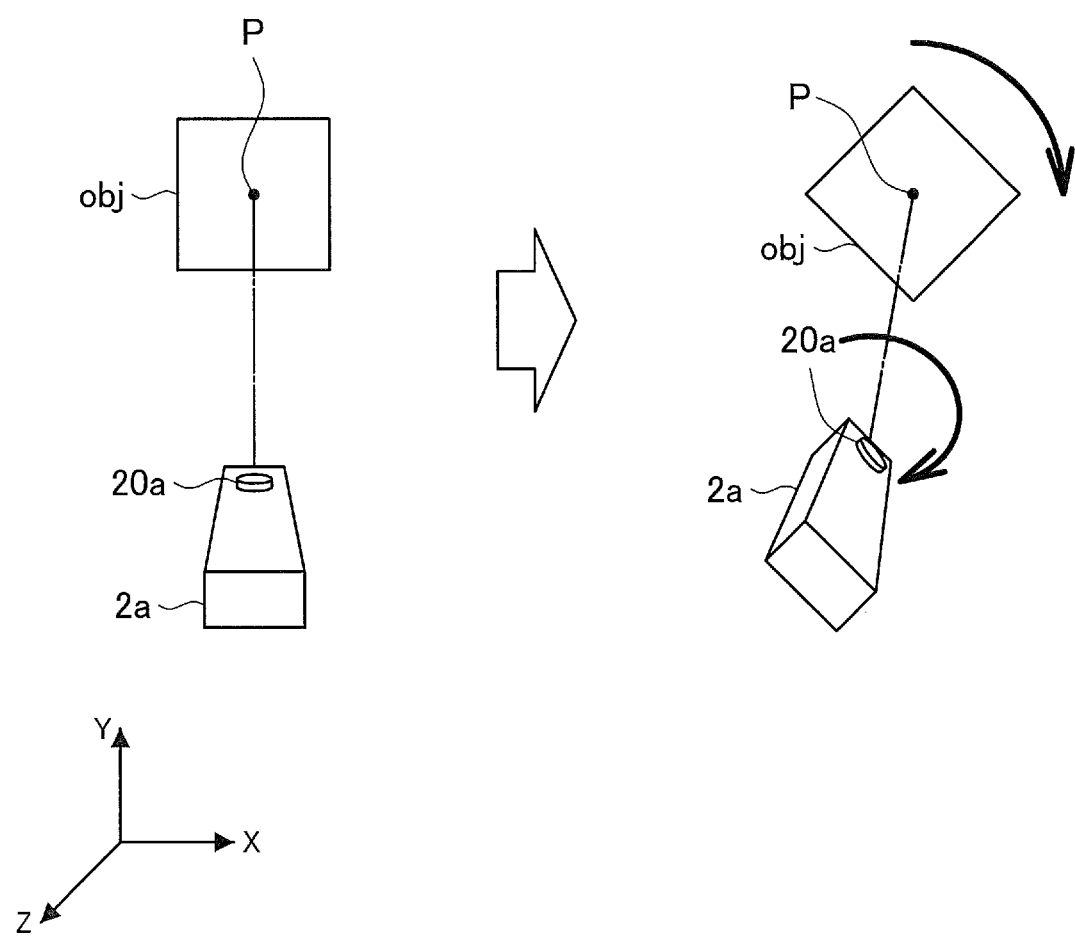
FIG. 10 is a figure for describing an operation input example using a movement of a roll rotation.

FIG. 10 is a figure for describing an operation input example using a movement of roll rotation. As shown on the left of FIG. 10, a user causes laser light V to be irradiated by half-pressing the operation button 20a of the laser pointer 2a, and matches an irradiation position P to an arbitrary object (obj) within an image projected on the screen S. Afterwards, the user determines the object (obj) to be an operation target by fully-pressing the operation button 20a of the laser pointer 2a, and causes the laser pointer 2a to be rotated (a rotation, rolling around the z-axis) in a state where the operation button 20a is fully-pressed. At this time, movement information (an inclination or angular velocity) from the laser pointer 2a is transmitted to the projector 1a, and the projector 1a transmits, to the PC 3, a control signal (pointer information) for causing display of the object determined as an operation target to be changed in accordance with the movement information of the laser pointer 2a. The PC 3 performs a display control so as to rotate the object determined as an operation target to match the rotation of the laser pointer 2a, in accordance with the pointer information. Then, the PC 3 transmits a display controlled projection image for rotating the object to the projector 1a, and the projector 1a projects the transmitted projection image on the screen S.

In this way, as shown on the right of FIG. 10, the object (obj) around the z-axis in accordance with a roll rotation of the laser pointer 2a.

(Forward-Backward Vertical Movement)

Figure 11:
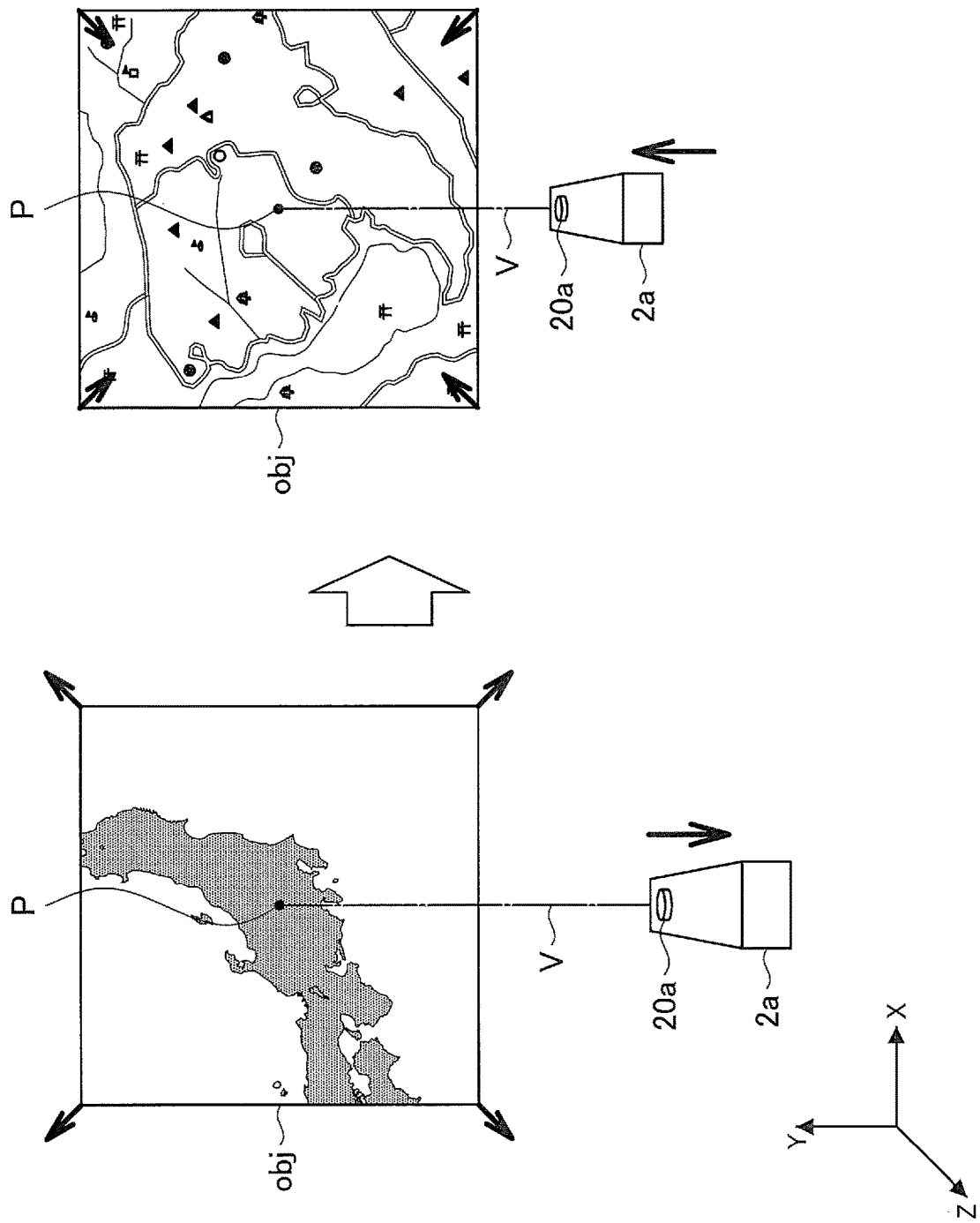
FIG. 11 is a figure for describing an operation input example using a movement of forward-backward vertical movement.

FIG. 11 is a figure for describing an operation input example using a movement of forward-backward vertical movement. As shown in FIG. 11, a user causes laser light V to be irradiated by half-pressing the operation button 20a of the laser pointer 2a, and matches an irradiation position P to an arbitrary object (for example, a map image) within an image projected on the screen S.

Afterwards, the user determines the object (obj) to be an operation target by fully-pressing the operation button 20a of the laser pointer 2a, and moves the laser pointer 2a in a forward-backward vertical direction with respect to the screen S (caused to translate in the z-axis direction) in a state where the operation button 20a is fully-pressed. At this time, movement information (an acceleration or direction) from the laser pointer 2a is transmitted to the projector 1a, and the projector 1a transmits, to the PC 3, a control signal (pointer information) for causing display of the object determined as an operation target to be changed in accordance with the movement information of the laser pointer 2a. The PC 3 performs a display control so as to enlarge/reduce the object determined as an operation target to match the forward-backward vertical movement of the laser pointer 2a, in accordance with the pointer information. Then, the PC 3 transmits a display controlled projection image for enlarging/reducing the object to the projector 1a, and the projector 1a projects the transmitted projection image on the screen S.

In this way, as shown in FIG. 11, for example, when moving the laser pointer 2a in a vertical direction backwards, the map image (object) is displayed reduced (zoom-out), and when moving the laser pointer 2a in a vertical direction forwards, the map image (object) is displayed enlarged (zoom-in).

(Panning Movement)

Figure 12:
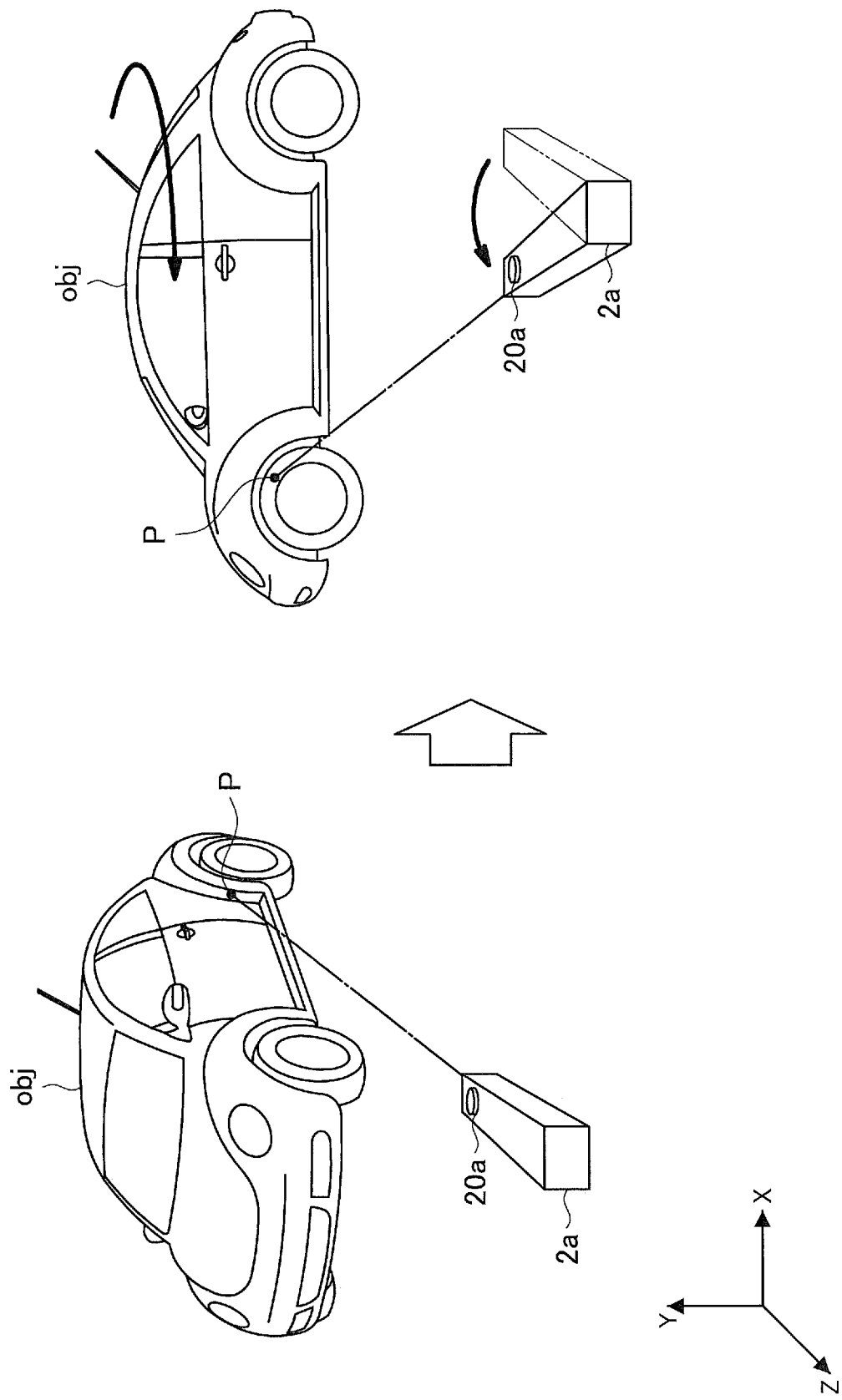
FIG. 12 is a figure for describing an operation input example using a movement for left-right panning.

FIG. 12 is a figure for describing an operation input example using a movement for left-right panning. As shown on the left of FIG. 12, a user causes laser light V to be irradiated by half-pressing the operation button 20a of the laser pointer 2a, and matches an irradiation position P to an arbitrary object (for example, a 3D object) within an image projected on the screen S.

Afterwards, the user determines the object (obj) to be an operation target by fully-pressing the operation button 20a of the laser pointer 2a, and causes the laser pointer 2a to perform a panning movement in a left-right horizontal direction with respect to the screen S (swinging left-right) in a state where the operation button 20a is fully-pressed. At this time, movement information (an acceleration or direction) from the laser pointer 2a is transmitted to the projector 1a, and the projector 1a transmits, to the PC 3, a control signal (pointer information) for causing display of the object determined as an operation target to be changed in accordance with the movement information of the laser pointer 2a. The PC 3 performs a display control so as to rotate (yawing) the object determined as an operation target around the y-axis to match the panning movement of the laser pointer 2a, in accordance with the pointer information. Then, the PC 3 transmits a projection image in which the object is yawing controlled to the projector 1a, and the projector 1a projects the transmitted projection image on the screen S.

In this way, as shown on the right of FIG. 12, for example, when causing the laser pointer 2a to perform a panning movement, the 3D object is rotated (yawing) around the y-axis direction.

(Operation Input by a Plurality of the Laser Pointers 2a)

In the operation system according to the present embodiment, it is also possible to perform an operation input by simultaneously using a plurality of the laser pointers 2a. Hereinafter, a description will be made by referring to FIG. 13 and FIG. 14.

Figure 13:
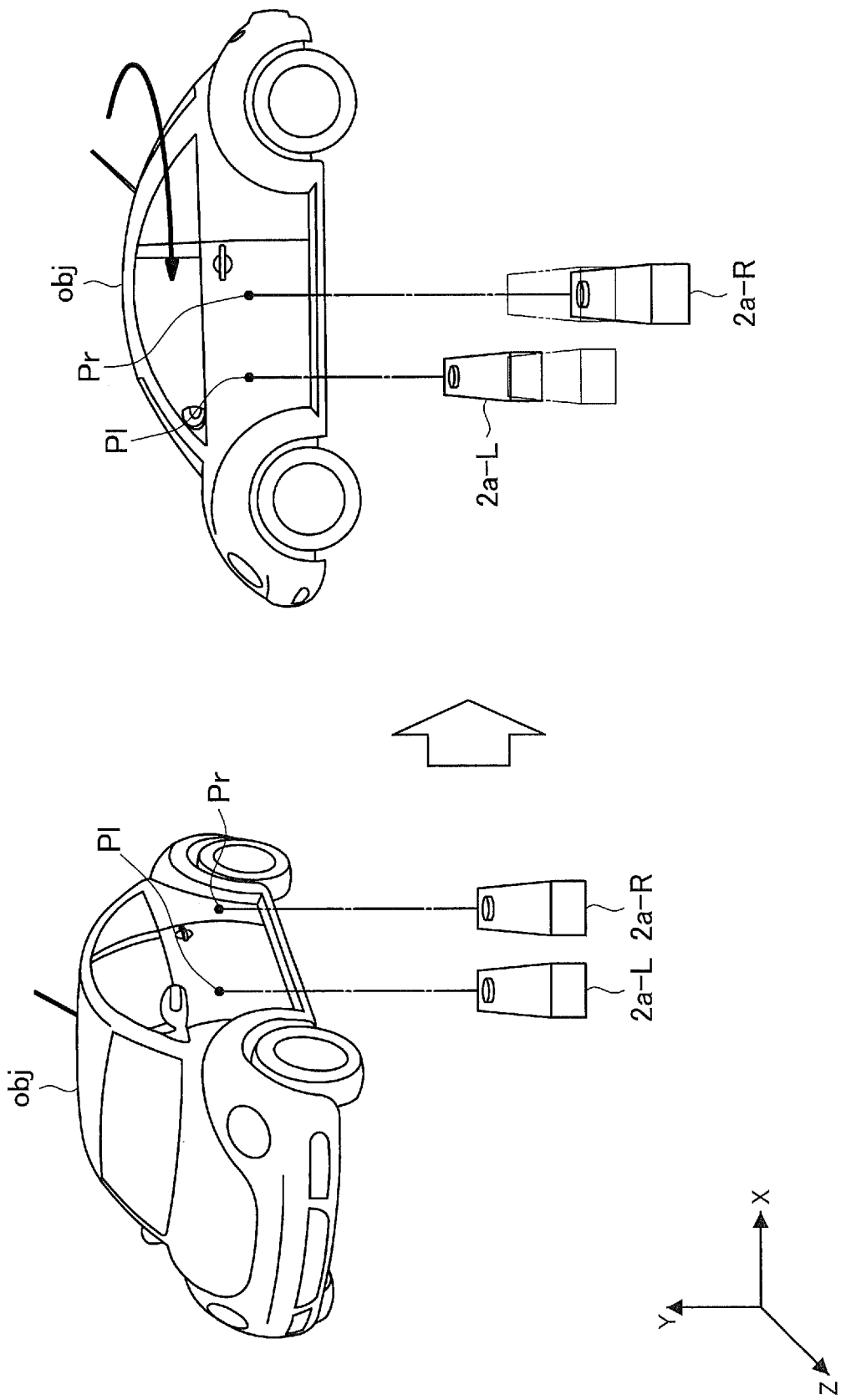
FIG. 13 is a figure for describing a case where performing a viewpoint position operation of a 3D object by using a plurality of laser pointers.

FIG. 13 is a figure for describing a case where performing a viewpoint position operation of a 3D object (rigid body) by using a plurality of the laser pointers 2a. As shown on the left of FIG. 13, a user causes laser light V to be irradiated by holding a plurality of laser pointers 2a-R and 2a-L in both hands and half-pressing the respective operation buttons 20a, and matches irradiation positions Pr and Pl to an arbitrary object (for example, a 3D object) within an image projected on the screen S.

Afterwards, the user determines the object (obj) to be an operation target by fully-pressing the operation buttons 20a of the laser pointers 2a-R and 2a-L, and causes the laser pointers 2a-R and 2a-L to perform a panning movement in a left-right horizontal direction with respect to the screen S (caused to swing left-right) in a state where the operation buttons 20a are fully-pressed. At this time, the projector 1a respectively recognizes coordinate positions of each of the irradiation positions Pr and Pl by the laser pointers 2a-R and 2a-L, based on a visible light captured image of a projection image, and determines the 3D object for which the irradiation positions Pr and Pl are retained at both ends as an operation target.

Further, movement information (an acceleration or direction) from the laser pointers 2a-R and 2a-L is transmitted to the projector 1a. The projector 1a transmits, to the PC 3, a control signal (pointer information) for causing display of the object determined as an operation target to be changed in accordance with the movement information of the laser pointers 2a-R and 2a-L.

The PC 3 performs a display control so as to rotate (yawing) the object determined as an operation target around the y-axis to match the panning movement of the laser pointer 2a, in accordance with the pointer information. Then, the PC 3 transmits a projection image in which the object is yawing controlled to the projector 1a, and the projector 1a projects the transmitted projection image on the screen S.

In this way, as shown on the right of FIG. 13, by causing the laser pointers 2a-R and 2a-L to perform a panning movement, the 3D object retained by the irradiation positions Pr and Pl of the laser light V irradiated from the plurality of laser pointers 2a-R and 2a-L can be rotated around the y-axis direction.

In the above described example shown in FIG. 13, while a 3D object determined as an operation target is formed from one rigid body, the operation target according to the present embodiment is not limited to the example shown in FIG. 13, and may be a 3D object, for example, formed by indirectly connecting a plurality of rigid bodies. Hereinafter, a specific description will be made by referring to FIG. 14.

Figure 14:
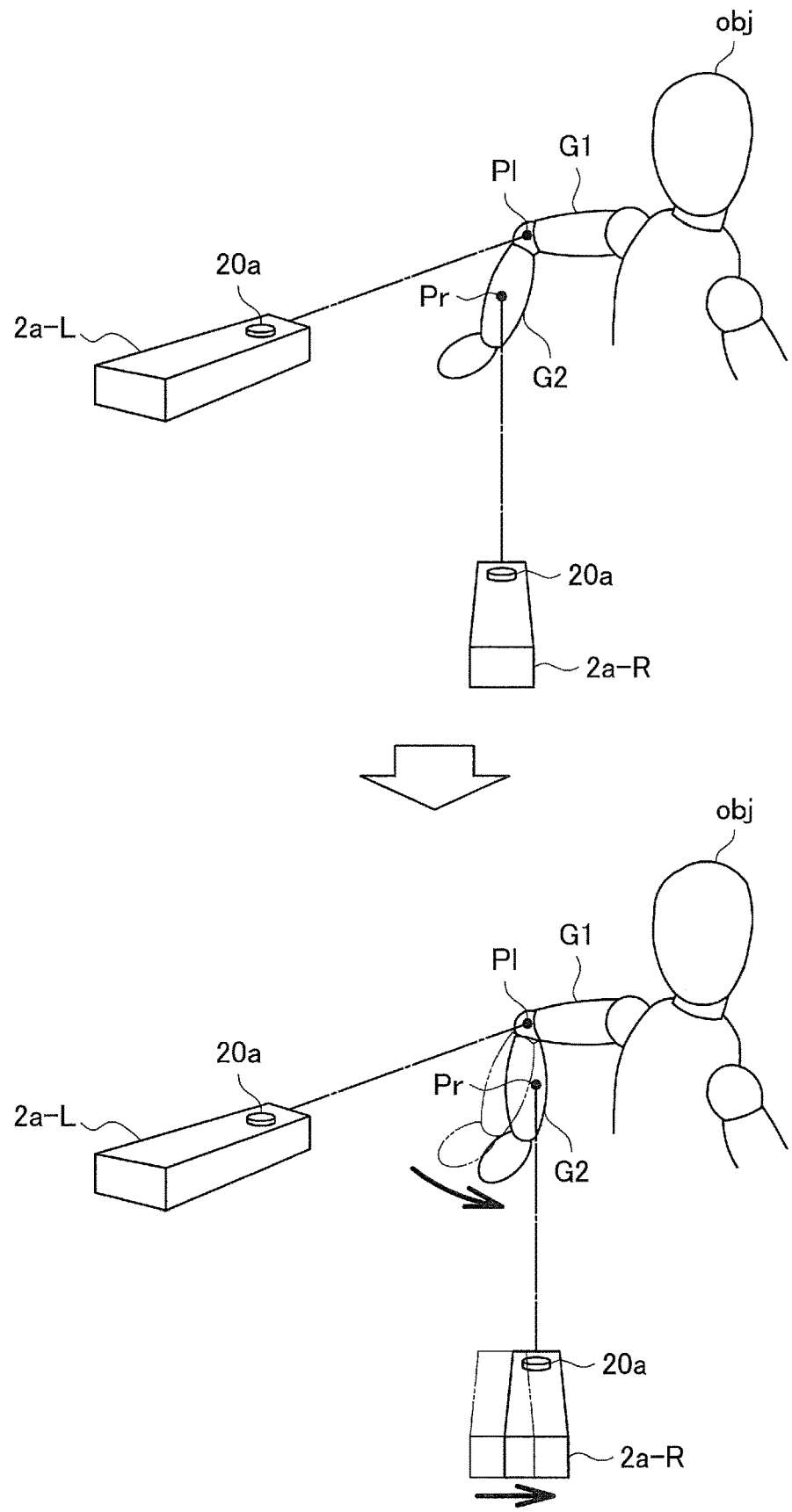
FIG. 14 is a figure for describing a case where operating a 3D object formed by indirectly connecting a plurality of rigid bodies.

FIG. 14 is a figure for describing a case where operating a 3D object formed by indirectly connecting a plurality of rigid bodies. As shown on the top of FIG. 14, a user causes laser light V to be irradiated by holding a plurality of laser pointers 2a-R and 2a-L in both hands and half-pressing the respective operation buttons 20a, and matches irradiation positions Pr and Pl to an arbitrary object (for example, a 3D object) within an image projected on the screen S. Specifically, the user matches the irradiation position Pr to an indirect portion between a rigid body G1 and a rigid body G2 which form the 3D object (obj), or matches the irradiation position Pr to the rigid body G2 indirectly connected to the rigid body G1.

Afterwards, the user determines the object (the rigid body G2 indicated by the irradiation position Pr) to be an operation target by fully-pressing the operation buttons 20a of the laser pointers 2a-R and 2a-L, and causes the laser pointer 2a-L to be moved in a horizontal direction in a state where the operation buttons 20a are fully-pressed. At this time, the projector 1a respectively recognizes coordinate positions of each of the irradiation positions Pr and Pl by the laser pointers 2a-R and 2a-L, based on a visible light captured image of a projection image.

Further, movement information (an acceleration or direction) from the laser pointers 2a-R and 2a-L is transmitted to the projector 1a. The projector 1a transmits, to the PC 3, a control signal (pointer information) for bending the rigid body G2 indicated by the irradiation position Pr at the indirect portion indicated by the irradiation position Pl in accordance with the movement information of the laser pointer 2a-R.

The PC 3 performs a display control so as to bend the rigid body G2 of the 3D object determined as an operation target at the indicated indirect portion to match the horizontal movement of the laser pointer 2a, in accordance with the pointer information. Then, the PC 3 transmits a projection image display controlled so as to bend the rigid body G2 at the prescribed indirect portion to the projector 1a, and the projector 1a projects the transmitted projection image on the screen S.

In this way, as shown on the bottom of FIG. 14, in the 3D object formed from a plurality of rigid bodes, at the indirect portion of the 3D object indicated by the irradiation position Pl by the laser pointer 2a-L, the rigid body G2 connected to this indirect portion can be moved in accordance with a movement of the laser pointer 2a-R.

(Operation Inputs by the Non-Visible Light Marker M)

As described with reference to FIG. 4, in the operation system formed by the third system configuration, movement information of the laser pointer 2c is acquired in the projector 1c via the non-visible light marker M. Here, operation inputs by the non-visible light marker M will be described by referring to FIG. 15.

Figure 15:
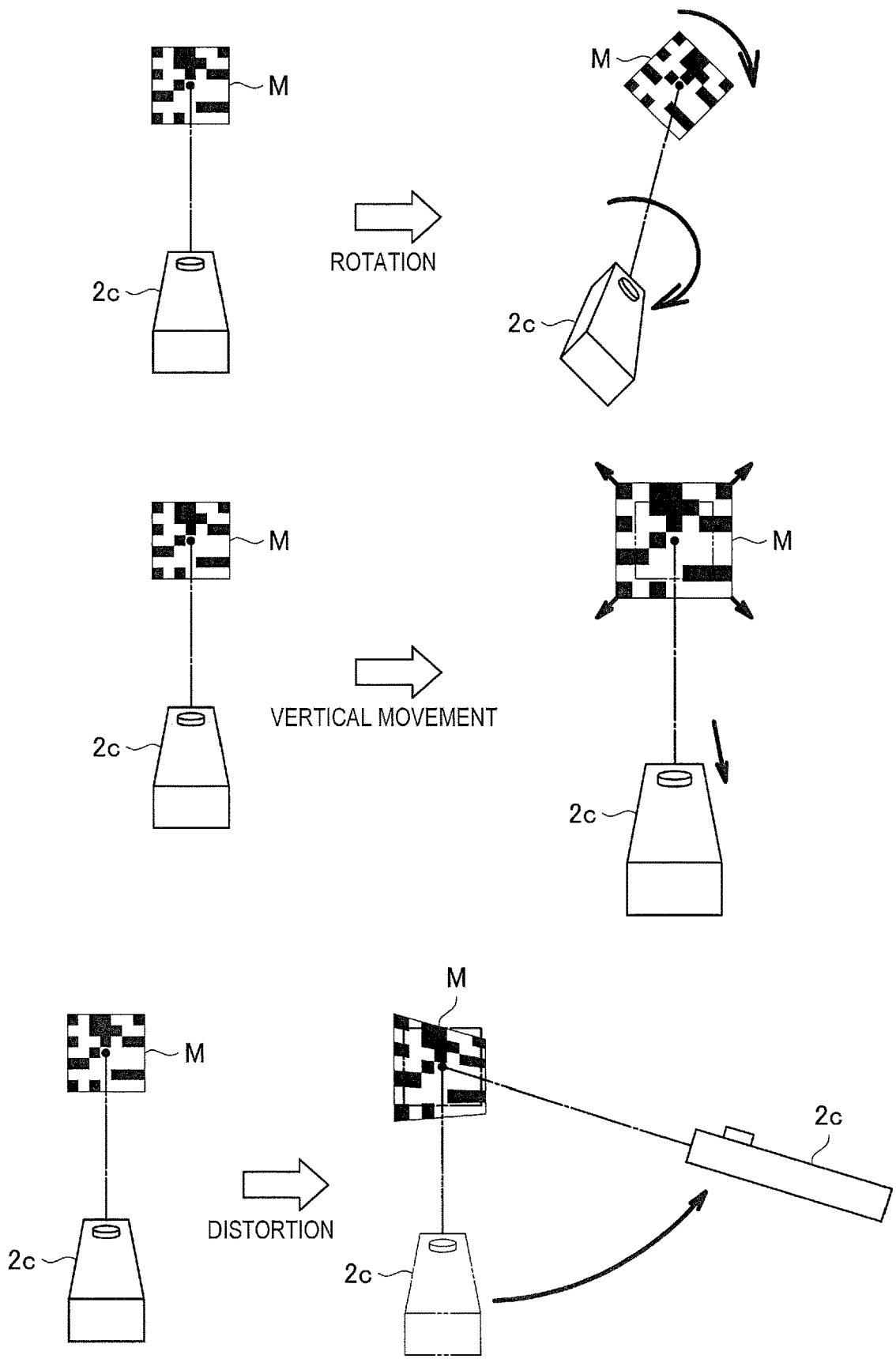
FIG. 15 is a figure for describing an operation input by a non-visible light marker.

For example, as shown on the top of FIG. 15, the non-visible light marker M irradiated from the laser pointer 2c rotates the same as the rotation of the laser pointer 2c. The projector 1c, which performs non-visible light imaging of a projection image on which the non-visible light marker M is irradiated, can analyze the inclination of this non-visible light marker M, by analyzing a non-visible light captured image, and can acquire movement information (a rotation movement) of the laser pointer 2c, in accordance with the inclination of the non-visible light marker M.

Further, as shown in the center of FIG. 15, the size of the non-visible light marker M irradiated from the laser pointer 2c becomes larger as the laser pointer 2c moves away from the screen S. The projector 1c, which performs non-visible light imaging of a projection image on which the non-visible light marker M is irradiated, can analyze the size of this non-visible light marker M, by analyzing a non-visible light captured image, and can acquire movement information (a vertical movement) of the laser pointer 2c, in accordance with a change of the size of the non-visible light marker M.

Further, as shown on the bottom of FIG. 15, the shape of the non-visible light marker M irradiated from the laser pointer 2c is distorted as the laser pointer 2c moves diagonally with respect to the screen S. The projector 1c, which performs non-visible light imaging of a projection image on which the non-visible light marker M is irradiated, can analyze the shape of this non-visible light marker M, by analyzing a non-visible light captured image, and can acquire movement information (a pan/tilt movement) of the laser pointer 2c, in accordance with a change (distortion) of the shape of the non-visible light marker M.

Heretofore, operation inputs by the non-visible light marker M have been described. Note that, while the examples of the non-visible light marker M irradiated from the laser pointer 2c are two-dimensional bar codes such as shown in FIG. 15, image recognition technology such as a cyber-code, for example, can be used for an analysis of such two-dimensional bar codes. Further, in the above described examples, while the non-visible light marker M is used, it is also possible to similarly have an operation input by a visible light marker in the above described operation system formed by the system configuration described with reference to FIG. 3.

(Irradiation Input by a Plurality of Users)

It is also possible for the operation system according to the present embodiment to accept independent operation inputs by each of a plurality of users. Heretofore, a description will be made by referring to FIG. 16.

Figure 16:
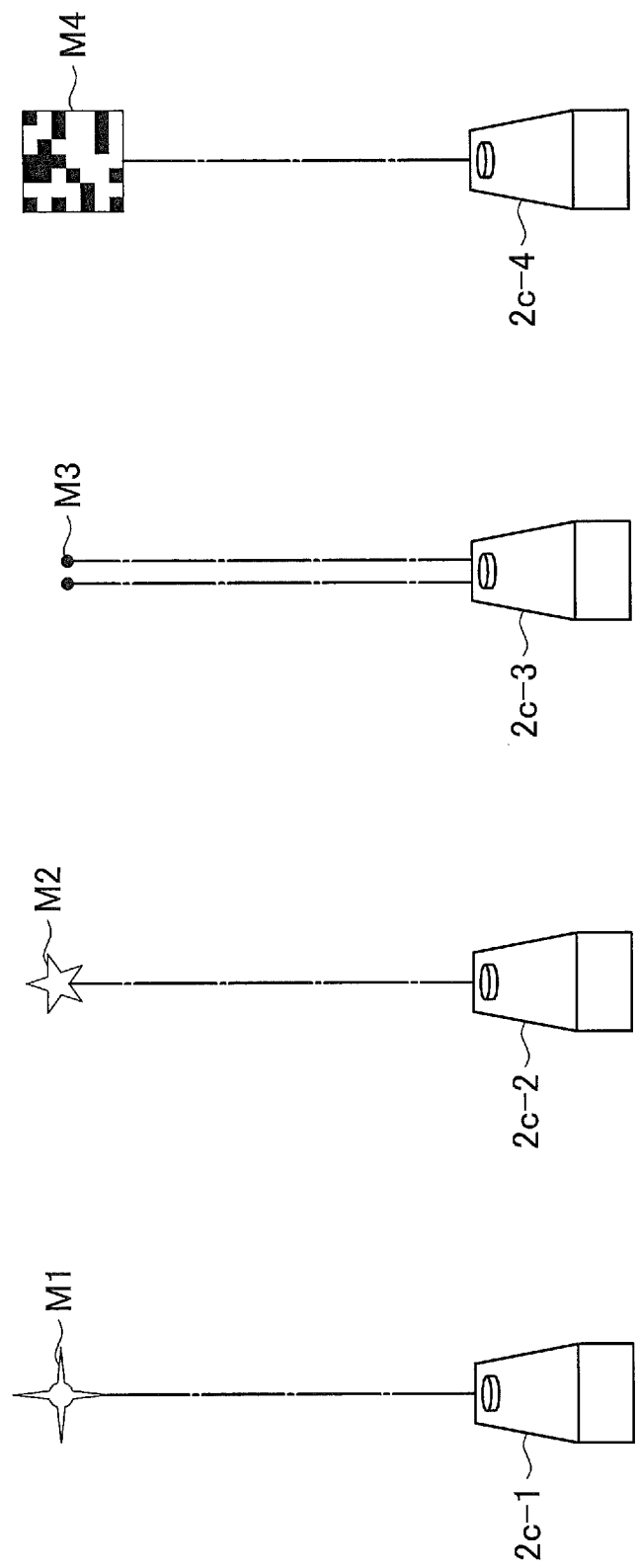
FIG. 16 is a figure for describing the identification of each irradiation position by a plurality of laser pointers.

FIG. 16 is a figure for describing an identification of each of the irradiation positions by a plurality of the laser pointers 2c. As shown in FIG. 16, in the case where the shape or color of non-visible light markers M1 to M3 irradiated from each of the laser pointers 2c-1 to 2c-3 are mutually different, the projector 1c can perform identification based on the shape or color of the non-visible light markers M1 to M3, and can specify a track of each of the laser pointers 2c. Note that, the non-visible light marker M-3 has a plurality of non-visible light lasers irradiated in parallel.

Further, the non-visible light markers M may not simply have a difference of shape or color, and may be set to two-dimensional bar codes (the non-visible light marker M4 shown in FIG. 16) capable of embedding a user ID. In this way, interference due to simultaneous irradiation of many users can be avoided, and robust identification is made possible.

Further, it is also possible for the projector 1c to perform a specification of the operators (users) of the laser pointers 2c-1 to 2c-4, in accordance with a difference of shape or color such as shown in the non-visible light markers M1 to M3, or based on a user ID read out from the non-visible light marker M4. In the case where each user can be specified, the projector 1c can perform a setting of priority rights, such as the operation of which user is to be prioritized. For example, the projector 1c accepts with priority an operation of a specific user, prioritizes a user initially starting irradiation, prioritizes a specific user during a fixed time by starting irradiation, or moves a priority right by a wait-and-see win system which prioritizes an interruption of other users. Specifically, in the case where operations are competing for significantly changing a state in which all members are browsing, such as a screen transition of a projection image by button pressing, or scrolling of an entire screen, the convenience at the time of the operations by a plurality of users is improved, by accepting the operations in accordance with any of the above described priority systems.

5. MODIFIED EXAMPLE

To continue, a modified example of the system configuration of the operation system according to the present embodiment will be described by referring to FIG. 17 and FIG. 18. In the above described first to third system configuration examples, visible light/non-visible light imaging is performed, by the imaging unit 13 provided in the projector 1, for an image (projection image) projected on the screen S, and an irradiation position P is recognized based on a captured image.

However, the system configuration example of the operation system according to the present disclosure is not limited to the above described first to third system configurations, and may be a system which includes, for example, an imaging unit on the laser pointer 2 side, performs non-visible light imaging for a projection image, and recognizes an irradiation position P based on such a non-visible light captured image. Further, by performing non-visible light imaging only at the time when the operation button 20a is pressed, the image unit on the laser pointer 2 side can avoid a waste of power consumption.

5-1. System Configuration

Figure 17:
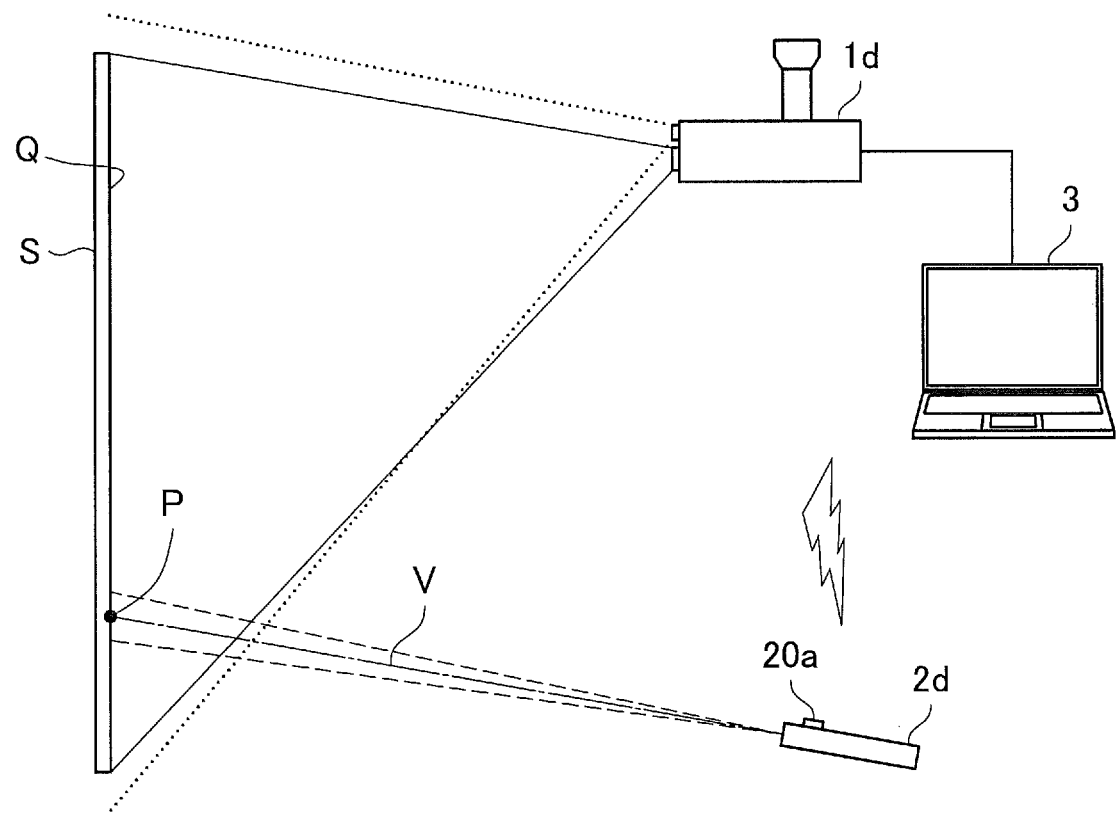
FIG. 17 is a figure for describing a modified example of a system configuration of the operation system according to the present embodiment.

FIG. 17 is a figure for describing a modified example of the system configuration of the operation system according to the present embodiment. As shown in FIG. 17, the system configuration according to the present modified example is formed from a projector 1d (an information processing apparatus according to the present disclosure), a laser pointer 2d, and a PC 3.

The projector 1d is connected to the PC 3 by wires/wirelessly, receives image data for projection from the PC 3, and projects the received image data for projection on a screen S. In addition, the projector 1d according to the present embodiment projects a coordinate specification map (also called a coordinate recognition image) Q of non-visible light such as an infrared light ray superimposed on the screen S (an image projection area). A projection area of the coordinate specification map Q of non-visible light may be in the range which includes the image projection area. Further, the projector 1d may project large one type of coordinate specification map Q on the screen S, or may diffuse and project different types of coordinate specification maps Q at some locations on the screen S. By projecting a plurality of different coordinate specification maps Q, an irradiation position can be specified at a partial viewing angle if the entire screen S does not enter a viewing angle of the imaging unit provided in the laser pointer 2d.

The laser pointer 2d performs irradiation of laser light V of a visible light ray, in accordance with a pressing state of the operation button 20a. Specifically, for example, the laser pointer 2d irradiates the laser light V of visible light in the case where the operation button 20a has been half-pressed, and continues irradiation of the laser light V in the case where it has been fully-pressed.

In addition, in the case where the operation button 20a has been fully-pressed, the laser pointer 2d according to the present embodiment performs non-visible light imaging for the range which includes an irradiation position P of the laser light V. Further, the laser pointer 2d recognizes a coordinate specification map Q' included in a non-visible light captured image, and reads out coordination specification information, and the size, inclination, distortion or the like of the coordinate specification map Q'. Then, the laser pointer 2d transmits the read-out information (hereinafter, also called reading information) to the projector 1d by wireless communication.

The projector 1d, which has received determination operation information and reading information from the laser pointer 2*d*, recognizes the irradiation position P of the laser pointer 2*d* based on the reading information, and determines an object to be an operation target. Further, the projector 1*d* acquires a movement (movement information) of the laser pointer 2*d*, based on the size, inclination, distortion or the like of the non-visible light imaging map Q' shown by the reading information.

Then, the projector 1*c* detects a control signal (pointer information) for performing a display change corresponding to the movement information of the laser pointer 2*d* on the determined object, and transmits this to the PC 3.

The PC 3 executes a display control process in accordance with the transmitted pointer information, and transmits image data for projection after execution to the projector 1*d*.

In this way, according to the operation system according to the present modified example, by projecting a coordinate specification map of non-visible light superimposed on a projection image from the projector 1*d*, and performing non-visible light imaging at the laser pointer 2*d* side, an irradiation position P is recognized by the laser pointer 2*d* based on this non-visible light captured image.

5-2. Internal Configuration

Figure 18:
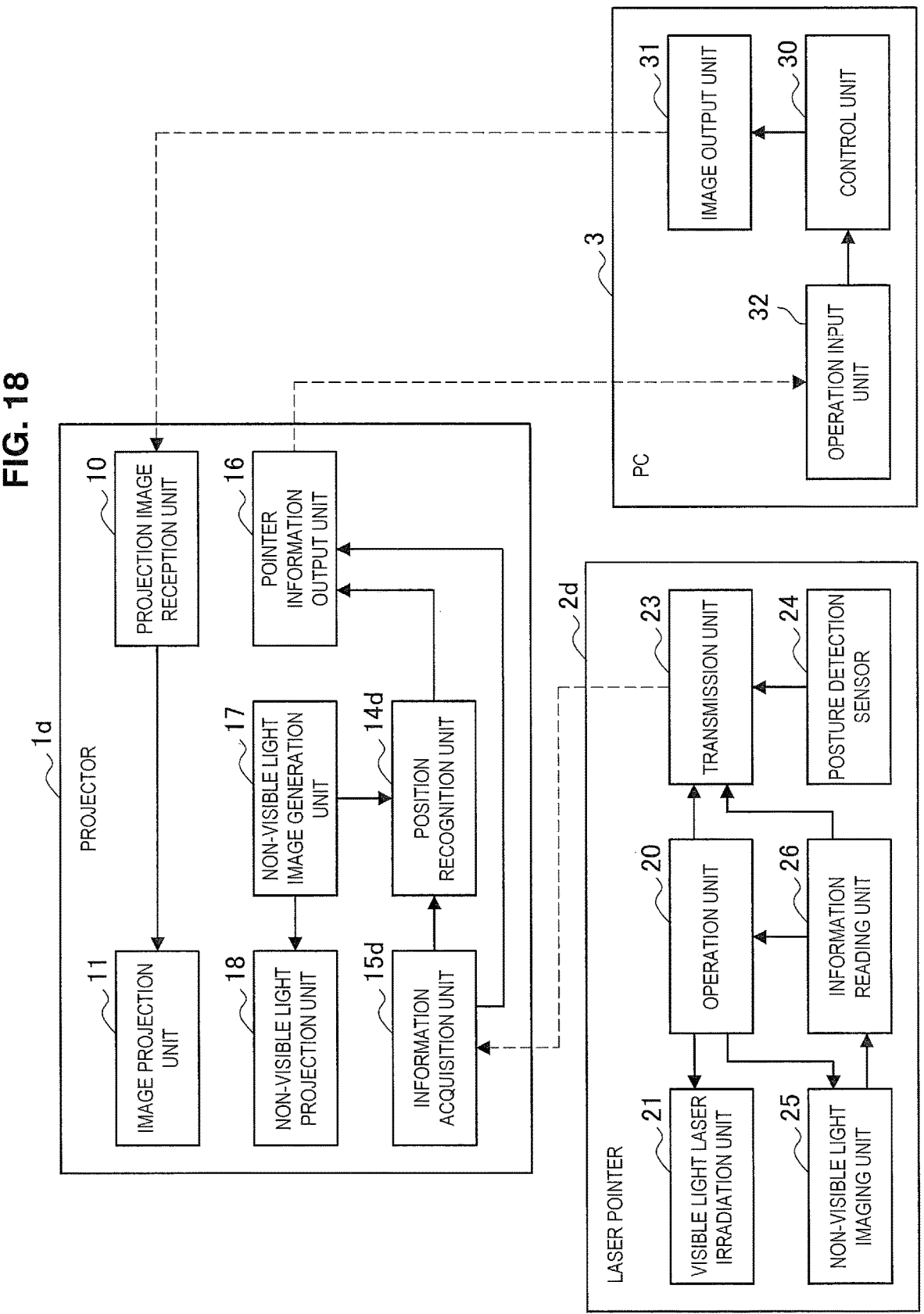
FIG. 18 is a block diagram which shows an example of an internal configuration of the operation system according to the present modified example.

To continue, the internal configuration of each apparatus included in the operation system according to the present embodiment will be specifically described by referring to FIG. 18. FIG. 18 is a block diagram which shows an example of the internal configuration of the operation system according to the present modified example. Hereinafter, each of the configurations will be specifically described. Note that, since the internal configuration of the PC 3 has been described above with reference to FIG. 6, a description will be omitted here.

(Projector 1*d*)

The projector 1*d* has a projection image reception unit 10, an image projection unit 11, a non-visible light image generation unit 17, a non-visible light projection unit 18, an information acquisition unit 15*d*, a position recognition unit 14*d*, and a pointer information output unit 16.

Since the projection image reception unit 10 and the image projection unit 11 have been described above with reference to FIG. 6, a description will be omitted here.

The non-visible light image generation unit 17 generates a coordinate specification map Q of non-visible light, in which is embedded coordinate specification information used at the time of recognizing an irradiation position P by the laser pointer 2*d*.

The non-visible light projection unit 18 projects the coordinate specification map Q of non-visible light generated by the non-visible light image generation unit 17 superimposed on a projection image of the screen S. Note that, the projections by the non-visible light projection unit 18 and the image projection unit 11 may be set to projections through different filters by a same light source.

The information acquisition unit 15*d* performs wirelessly communication with the laser pointer 2*d*, and receives determination operation information and reading information from the laser pointer 2*d*.

The position recognition unit 14*d* recognizes an irradiation position P (coordinate position) by the laser pointer 2*d*, based on the coordinate specification map Q created by the non-visible light image generation unit 17, and the coordinate specification information read out from a non-visible light captured coordinate specification map Q', included in the reading information received by the information acquisition unit 15*d*. For example, the position recognition unit 14*d* compares the coordinate specification map Q and the coordinate specification map Q' shown by the coordinate specification information, and specifies positions of the coordinate specification map Q' in the coordinate specification map Q. Then, the position recognition unit 14*d* recognizes a center position of the coordinate specification map Q' as an irradiation position P (coordinate position) by the laser pointer 2*d*.

At the time of receiving determination operation information by the information acquisition unit 15*d*, the pointer information output unit 16 determines an object within a projection image corresponding to a position of the irradiation position P recognized by the position recognition unit 14*d* as an operation target. Then, the pointer information output unit 16 detects a control signal (pointer information) for causing display of the determined object to be changed in accordance with a movement (movement information) of the laser pointer 2*d* shown by the reading information received by the information acquisition unit 15*d*, and transmits the detected pointer information to the PC 3 by wires/wirelessly.

(Laser Pointer 2*d*)

As shown in FIG. 18, the laser pointer 2*d* has an operation unit 20, a visible light laser irradiation unit 21, a non-visible light imaging unit 25, an information reading unit 26, a transmission unit 23, and a posture detection sensor 24.

The visible light laser irradiation unit 21 has a function which irradiates laser light V of visible light in the case where a user operation of a first stage (an irradiation indication operation) has been detected in the operation unit 20. Specifically, for example, the visible light laser irradiation unit 21 irradiates the laser light V in the case where the operation button 20*a* has been half-pressed.

The non-visible light imaging unit 25 has a function which performs non-visible light imaging for the range which includes a position (irradiation position P) irradiated by the laser light V in the case where a user operation of a second stage (a determination operation) has been detected in the operation unit 20. For example, the non-visible light imaging unit 25 performs non-visible light imaging in the case where the operation button 20*a* has been fully-pressed.

The information reading unit 26 recognizes a coordinate specification map Q', based on a non-visible light captured image, and reads out coordinate specification information, and the size, inclination, distortion or the like of the coordinate specification map Q'.

The transmission unit 23 transmits information (reading information) read out by the information reading unit 26, and information (determination operation information) which shows the user operation of a second stage detected by the operation unit 20, to the projector 1*d* by wireless communication. Further, the transmission unit 23 continuously wirelessly transmits a detection result output from the posture detection sensor 24, while a user operation of a second stage (a determination operation) is being detected (for example, while the operation button 20*a* is being fully-pressed), to the projector 1*d* as movement information.

Since the posture detection sensor 24 has been described above with reference to FIG. 6, a description will be omitted here.

As described above, in the operation system according to the present modified example, the non-visible light imaging unit 25 is provided in the laser pointer 2*d*, and non-visible light imaging of a projection image is performed in the laser pointer 2*d*. Further, the projector 1*d* can receive coordinate specification information read out from a non-visible light captured coordinate specification map Q' at the laser pointer 2d side, and can recognize an irradiation position P by the laser pointer 2d, based on this coordinate specification information. Further, the projector 1d can acquire a movement (movement information) of the laser pointer 2d, based on the size, inclination, distortion or the like of the non-visible light captured coordinate specification map Q'.

6. SUPPLEMENTAL REMARKS

To continue, supplemental remarks will be made for the operation system according to the present embodiment.

6-1. Front-View Control of the Display Screen

It is possible for the projector 1 according to the present embodiment to estimate a relative position of the laser pointer 2 with respect to the screen S, based on the direction of laser light irradiated from the laser pointer 2, and the movement information.

Figure 19:
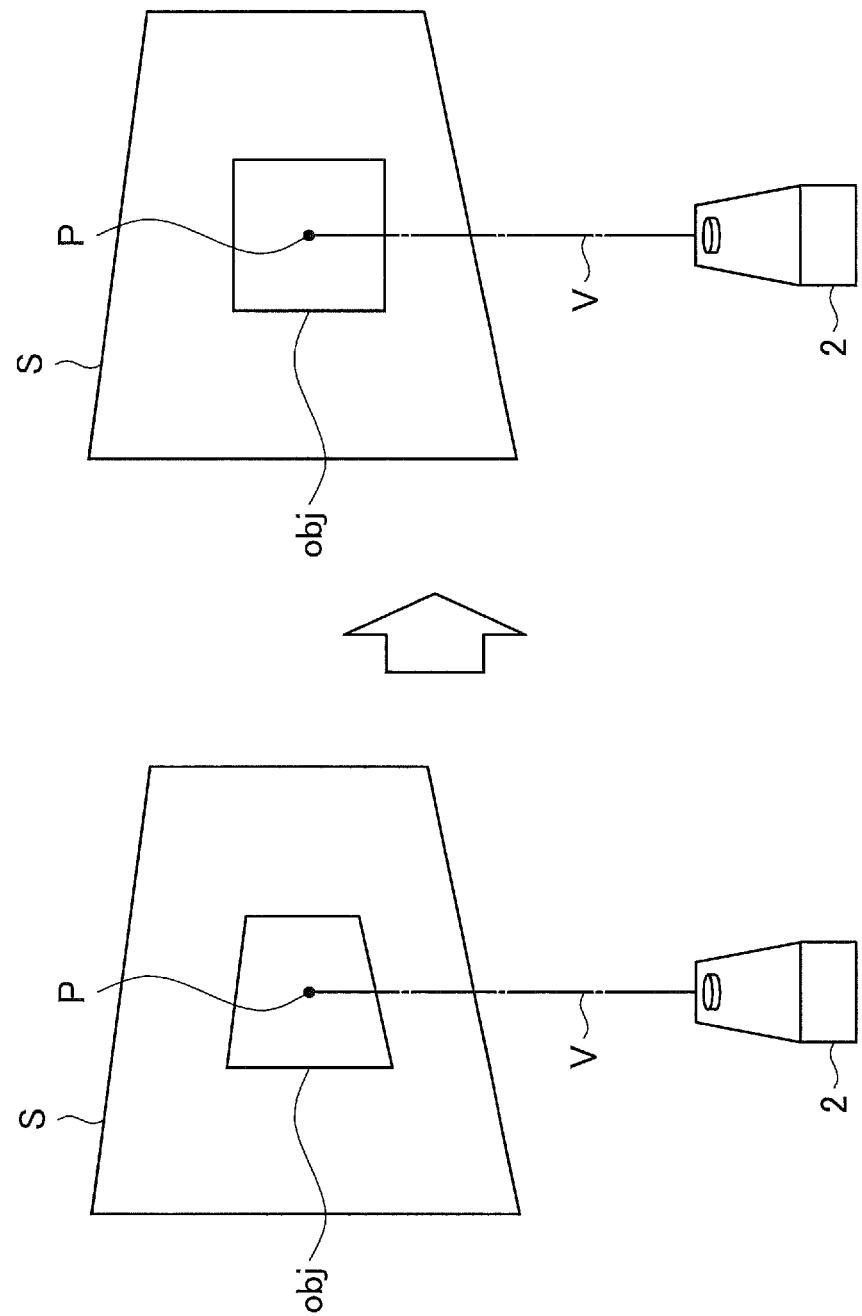
FIG. 19 is a figure for describing a front-view control of a display screen according to the present embodiment.

In this case, for example, the projector 1 outputs to the PC 3 by detecting a control signal for causing a display screen (an object within a projection image) to be front-view displayed so as to be easy to see for a user, by assuming that an operator (user) is present at an estimated position of the laser pointer 2. In particular, a user who performs a presentation by operating the laser pointer 2 will often be browsing while irradiating laser light V at a shallow angle with respect to the screen S, such as shown on the left of FIG. 19, and it may be necessary in such a case for a display screen (obj) viewed diagonally distorted to be correctly recognized within his or her head.

Accordingly, the projector 1 outputs to the PC 3 by detecting a control signal for causing a display screen (obj) to be front-view displayed in a user direction, a display control process is executed in accordance with this control signal by the PC 3, image data after execution is transmitted to the projector 1, and a projection is performed. In this way, as shown on the right of FIG. 19, a display control is performed so that the display screen (obj) is made a front-view to the user (at an estimated relative position of the laser pointer 2 based on the direction in which the laser light V is irradiated or the like).

In this way, by performing a display control so as to be made a front-view with respect to a user, the browsing burden of the user can be reduced. Further, by performing a front-view display control for each screen item positioned corresponding to a coordinate position of an irradiation position P, the user can selectively recognize the screen items. Further, it is specifically shown which screen items are to be displayed towards which people. Further, since the area of the buttons which form the screen items or the like is secured for an operator, a deterioration of an operation sense can be prevented in the case where performing an operation from a shallow angle with respect to the screen S.

6-2. Control of a Projection Color Area

Figure 20:
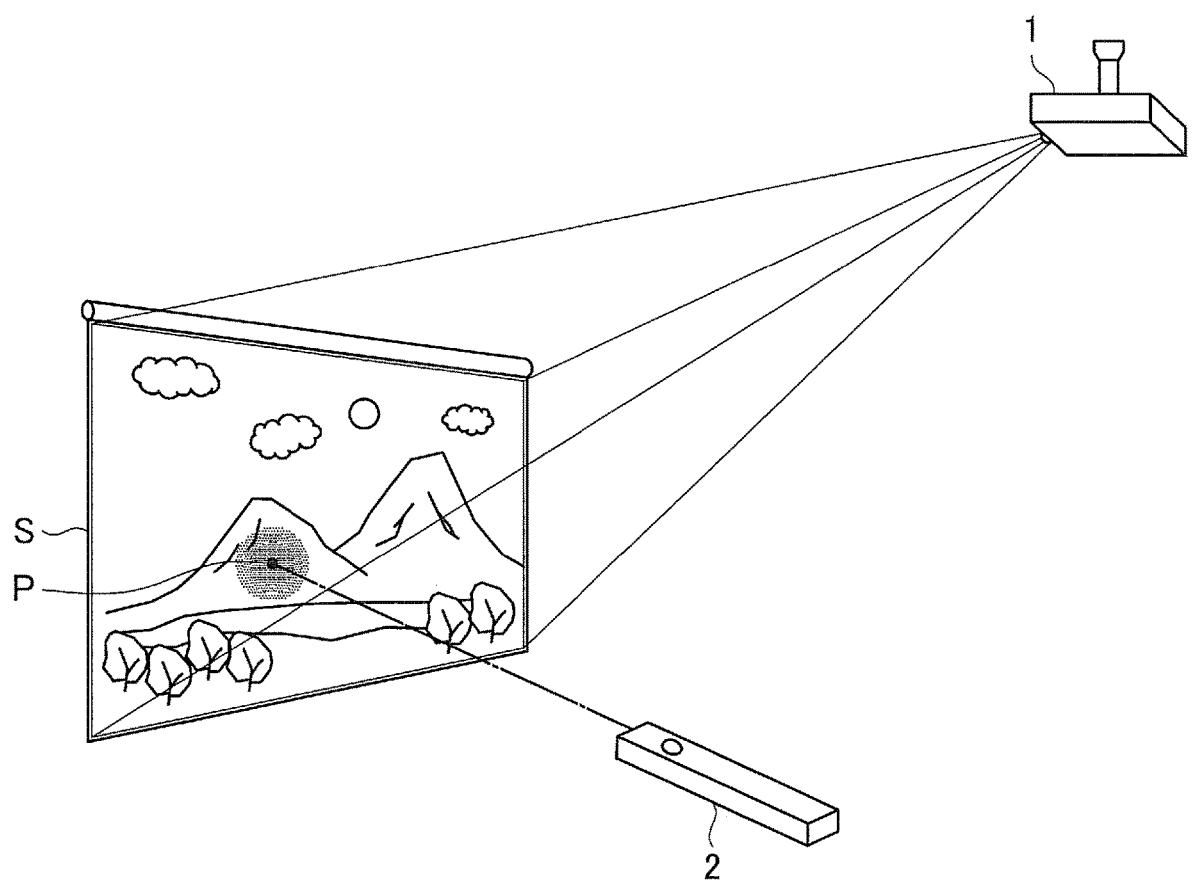
FIG. 20 is a figure for describing a control of a projection color area.

In the case where the luminance of a projection image by the projector 1 is high, or in the case where the laser light V of visible light irradiated from the laser pointer 2 is positioned at a display region of a similar color, a track of the laser pointer 2 will become difficult to visually recognize. Accordingly, as shown in FIG. 20, at the time when an irradiation position P by the laser pointer 2 has been detected on the screen S, the projector 1 and the PC 3 according to the present embodiment perform a display control, such as darkening the display region in the vicinity of the irradiation position P, or dropping the saturation of color. In this way, a track of the laser pointer 2 becoming difficult to visually recognize can be avoided.

6-3. Control of an Irradiation Region

In the operation system according to the present embodiment, an irradiation region of laser light from the laser pointer 2 can be limited to on the screen S. For example, since the projector 1 according to the present embodiment can recognize a coordinate position of the irradiation position P by the laser pointer 2, such as described above, in the case where the irradiation position P is removed from the screen S, a control signal for stopping the irradiation of laser light is wirelessly transmitted to the laser pointer 2. In this way, the laser pointer 2 automatically stops the irradiation of laser light in the case where the irradiation position P is removed from the screen S.

Further, in the case where it has been detected, by the projector 1, that there is a person present between the laser pointer 2 and the screen S, the projector 1 wirelessly transmits a control signal for stopping the irradiation of laser light to the laser pointer 2. In this way, since the irradiation of laser light is automatically stopped at the time when laser light irradiated from the laser pointer 2 has been mistakenly turned towards a person, safety can be maintained. Hereinafter, a specific description will be made by referring to FIG. 21.

FIG. 21 is a figure for describing an irradiation capable region. For an irradiation capable region, facial recognition or the like is performed in the projector 1, based on a captured image which includes a projection image within a viewing angle, for example, captured by the imaging unit provided in the projector 1, a decision is made as to whether or not a person is present in the vicinity of the screen S, and a portion where the person is not present is set to an irradiation capable region D.

Therefore, as shown in FIG. 21, for example, in the case where a person 5 has been detected between the laser pointer 2 and the screen S, the projector 1 sets a region in which the region corresponding to the person 5 is removed, from within the screen S, to an irradiation capable region D. Then, as shown on the top of FIG. 21, the projector 1 causes irradiation to continue in the case where the irradiation position P is positioned within the irradiation capable region D. Further, as shown on the left bottom of FIG. 21, in the case where it has been decided that the irradiation position P is removed from the irradiation capable region D on the screen S, in accordance with a movement of the laser pointer 2 and a track of the irradiation position P, the projector 1 wirelessly transmits a control signal for stopping the irradiation of laser light to the laser pointer 2. In this way, the laser pointer 2 can automatically stop the irradiation of laser light at the time when removed from the irradiation capable region D.

Further, as shown on the right bottom of FIG. 21, in the case where it has been decided that the irradiation position P has gone outside of the screen S, in accordance with a movement of the laser pointer 2 and a track of the irradiation position P, the projector 1 wirelessly transmits a control signal for stopping the irradiation of laser light to the laser pointer 2. In this way, the laser pointer 2 can automatically stop the irradiation of laser light at the time when removed from the screen S.

6-4. Operation Input Using the Outside of the Screen S

Heretofore, while a description has been made for an operation input which is performed by irradiating laser light V, a non-visible light marker M or the like by the laser pointer 2 within the range of the screen S, the range of an operation input in the operation system according to the present embodiment is not limited to within the range of the screen S.

Figure 22:
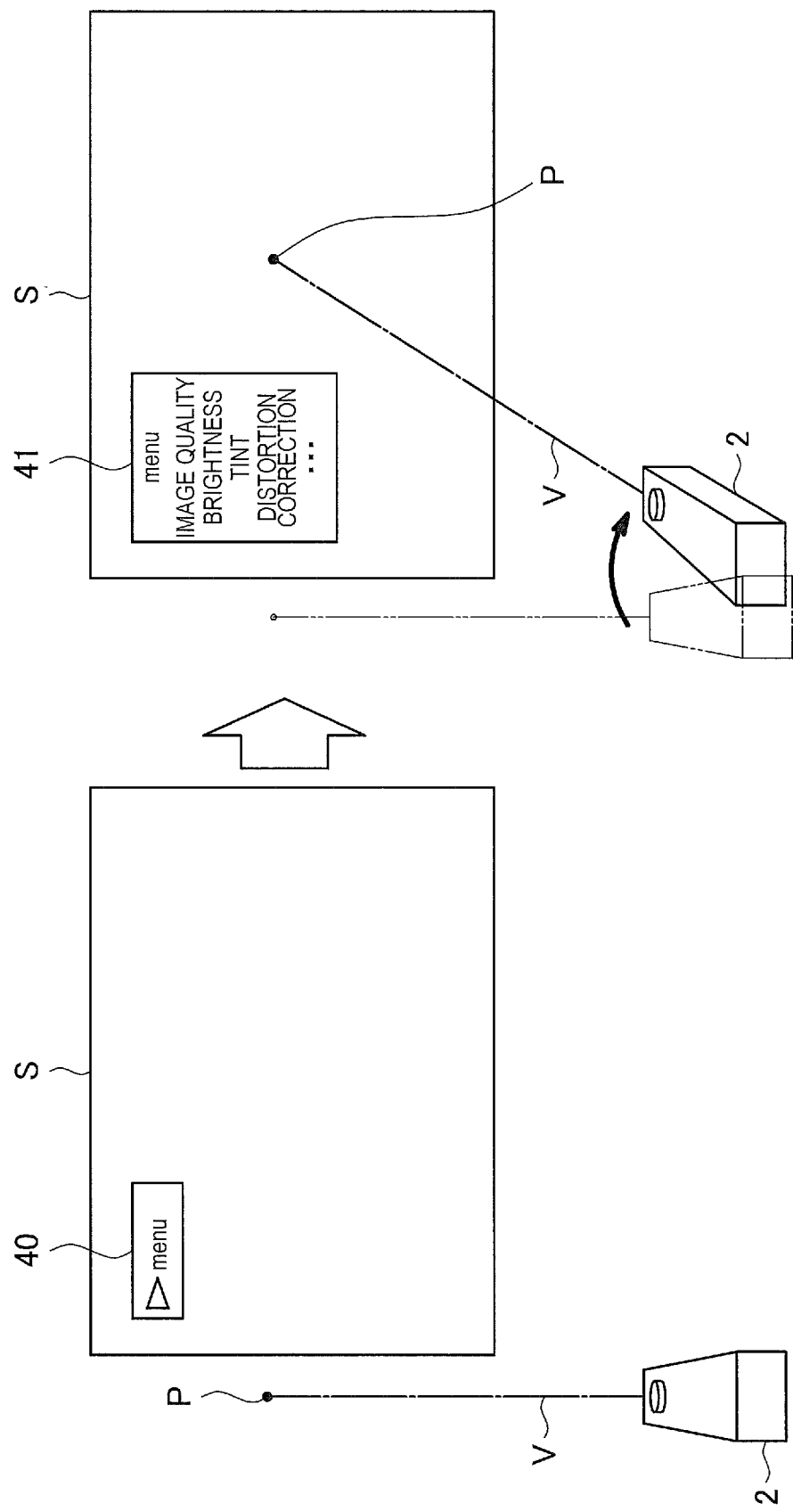
FIG. 22 is a figure for describing a swipe-in and swipe-out operation.
Figure 23:
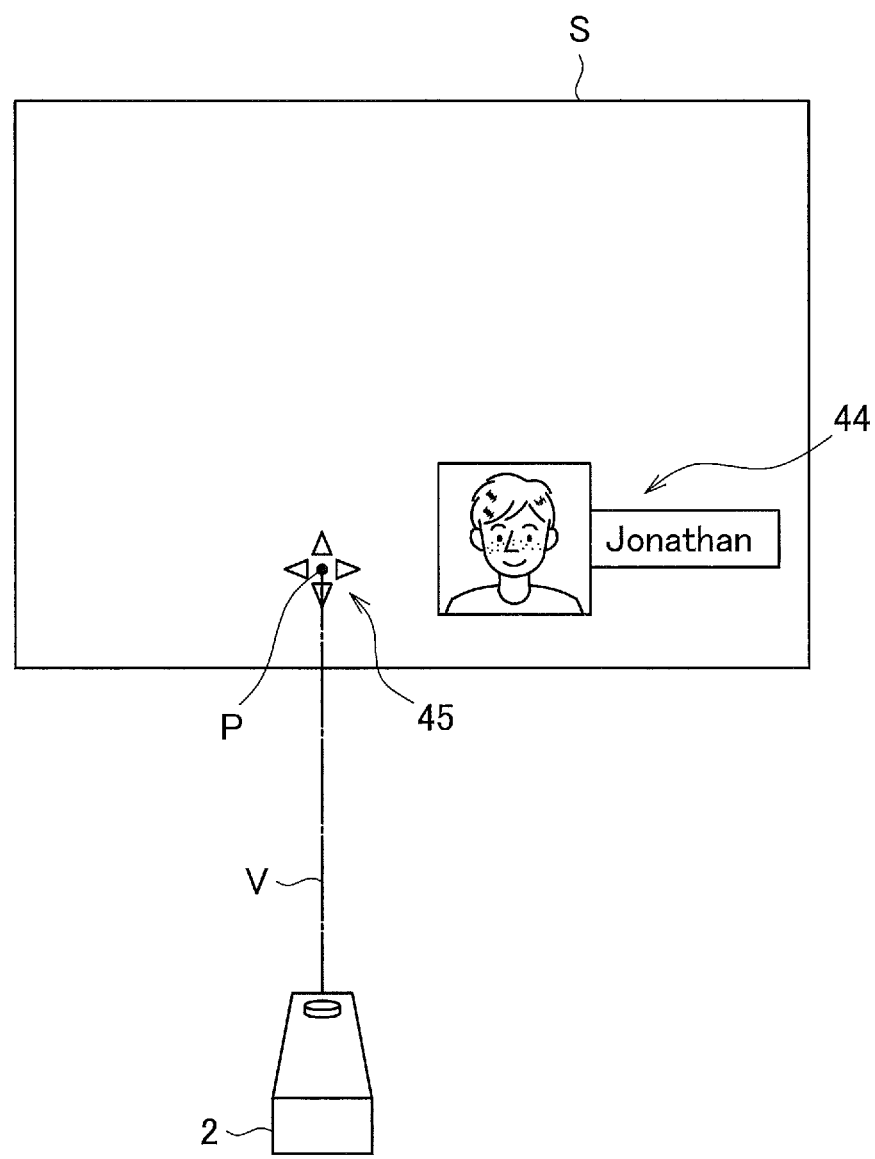
FIG. 23 is a figure for describing an expression of user information.

For example, in the case where a viewing angle of the imaging unit 13 provided in the projector 1 also includes the surroundings of the screen S, position coordinates of an irradiation position P outside of the screen S (or, a set screen range) can also be recognized, such as shown on the left of FIG. 22. In this way, the projector 1 can correspond to a gesture operation such as a swipe in which the irradiation position P moves from outside the screen to within the screen, or a swipe in which the irradiation position P moves from within the screen to outside the outside screen.

In this case, at the time when the irradiation position P has been pointed to a position capable of being detected outside of the screen S, an indicator 40 which shows that a swipe operation is possible is displayed (projected) on the screen S, such as shown on the left of FIG. 22. Further, when a swipe operation is actually performed, an operation such as displaying a menu is activated, for example, such as shown on the right of FIG. 22.

Further, it is possible for the operation system according to the present embodiment to not only be a swipe operation, but to also correspond to various gesture operations, such as drawing a circle outside of the screen S. Further, a guide display corresponding to a possible gesture operation outside of the screen S is displayed (projected) on an edge within the screen S (a position close to the irradiation position P outside of the screen S).

6-5. Display of Operator Information

The operation system according to the present embodiment can cause operator information (user information) of the laser pointer 2 to be displayed (projected) in the vicinity of the irradiation position P. Specifically, the projector 1 and the PC 3 identify the laser pointer 2, based on information received from the laser pointer 2, or an analysis result of a non-visible light/visible light marker by a one-dimensional/two-dimensional bar code irradiated from the laser pointer 2, and acquires user information.

Then, the projector 1 can cause an image 44 showing the user information to be displayed (projected) superimposed in the vicinity of the irradiation position P by the laser pointer 2, and can make it easy to be understood who is performing irradiation to a browser viewing the screen S or the like.

Further, the projector 1 can project a cursor 45 which shows information capable of an operation input to a projection image, can emphasize the irradiation position P of the laser pointer 2, and can make the operation state easy to be understood.

7. SUMMARY

As described above, in the operation system according to the present embodiment, an operation input can be intuitively performed to an object within a projection image by moving the laser pointer 2. Irradiation of laser light V is started by an operation of a first stage (for example, half-pressing of the operation button 20a), and an object of an operation target is determined in accordance with a continuing operation of a second stage (for example, fully-pressing of the operation button 20a). Also, by causing the laser pointer 2 to perform an up-down, left-right, forward-backward or pan/tilt movement, or a rotation movement, while the operation of a second stage is continued, an operation input can also be intuitively performed for causing display of a determined object to be similarly changed.

Further, since the irradiation distance of laser light is very long compared to that of general electric waves, it is also useful for a condition such as performing an operation to a large-sized projection image from a distance at a wide location.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, a computer program for causing hardware such as a CPU, ROM and RAM built into the projector 1, laser pointer 2, and PC 3 to exhibit functions of the above described projector 1, laser pointer 2, and PC 3 can be created. Further, a storage medium capable of being read by a computer on which this computer program is stored is also provided.

Additionally, the present technology may also be configured as below.

(1)

An information processing apparatus including:

a recognition unit which recognizes an irradiation position of laser light by a laser pointer to a projection image;

an acquisition unit which acquires movement information of the laser pointer; and an output unit which outputs a control signal for causing display of an object within a projection image corresponding to the irradiation position to be changed in accordance with the movement information.

(2)

The information processing apparatus according to (1), wherein the output unit determines an object positioned corresponding to the irradiation position as an object of an operation target at a time of receiving determination operation information detected in an operation unit provided in the laser pointer.

(3)

The information processing apparatus according to (2), further including:

a reception unit which receives information showing the determination operation from the laser pointer.

(4)

The information processing apparatus according to any one of (1) to (3), wherein the recognition unit recognizes an irradiation position of laser light of visible light or laser light of non-visible light irradiated from the laser pointer.

(5)

The information processing apparatus according to any one of (1) to (3), wherein the recognition unit recognizes position coordinates of a visible light marker or a non-visible light marker irradiated from the laser pointer as an irradiation position of the laser light.

(6)

The information processing apparatus according to (5), wherein the visible light marker or the non-visible light marker is a figure or a one-dimensional/two-dimensional bar code.

(7)

The information processing apparatus according to (5) or (6), wherein the acquisition unit acquires movement information of the laser pointer based on at least one of a size, an inclination and a distortion of the visible light marker or the non-visible light marker.

(8)

The information processing apparatus according to any one of (1) to (7), wherein the movement information is information which shows a movement of a vertical/horizontal direction, a rotation movement, or a movement of a pan/tilt, with respect to the projection image of the laser pointer.

(9)

The information processing apparatus according to any one of (1) to (8), wherein the acquisition unit receives the movement information from the laser pointer.

(10)

The information processing apparatus according to (1), wherein the recognition unit recognizes an irradiation position of laser light to the projection image by the laser pointer based on a non-visible light captured image in which a coordinate recognition image of non-visible light projected and superimposed on the projection image is captured by a non-visible light imaging unit provided in the laser pointer.

(11)

The information processing apparatus according to any one of (1) to (10), wherein the recognition unit identifies and recognizes each irradiation position by a plurality of laser pointers based on a shape or color of each visible light/non-visible light marker irradiated to the projection image from a plurality of laser pointers, or a user ID embedded in a marker.

(12)

A control method including:

a step of recognizing an irradiation position of laser light by a laser pointer to a projection image;

a step of acquiring movement information of the laser pointer; and a step of outputting a control signal for causing display of an object within a projection image corresponding to the irradiation position to be changed in accordance with the movement information.

(13)

A program for causing a computer to function as:

a recognition unit which recognizes an irradiation position of laser light by a laser pointer to a projection image;

an acquisition unit which acquires movement information of the laser pointer; and an output unit which outputs a control signal for causing display of an object within a projection image corresponding to the irradiation position to be changed in accordance with the movement information.

(14)

A storage medium having a program stored therein, the program causing a computer to function as:

a recognition unit which recognizes an irradiation position of laser light by a laser pointer to a projection image;

an acquisition unit which acquires movement information of the laser pointer; and an output unit which outputs a control signal for causing display of an object within a projection image corresponding to the irradiation position to be changed in accordance with the movement information.

REFERENCE SIGNS LIST 1, 1a to 1d projector
2, 2a to 2d laser pointer
3 PC
10 projection image reception unit
11 image projection unit
13 imaging unit
13v visible light imaging unit
13n non-visible light imaging unit
14, 14d position recognition unit
15, 15d information acquisition unit
16 pointer information output unit
17 non-visible light image generation unit
18 non-visible light projection unit
20 operation unit
20a operation button
21 visible light laser irradiation unit
23 transmission unit
24 posture detection sensor
25 non-visible light imaging unit
26 information reading unit
30 control unit
31 image output unit
32 operation input unit

The invention claimed is:

1. An information processing apparatus, comprising:
a central processing unit (CPU) configured to:
recognize a first irradiation position of a non-visible light marker emitted, on a projection image, by a laser pointer of a plurality of laser pointers, wherein the projection image includes a plurality of objects, the plurality of objects are different from the non-visible light marker,
the first irradiation position is recognized based on a difference between the projection image and a non-visible light captured image, and
the non-visible light captured image includes the non-visible light marker;
receive determination operation information from the plurality of laser pointers;
determine an object, from the plurality of objects, that corresponds to the first irradiation position of the non-visible light marker in the projection image as an operation target, wherein the object is determined as the operation target based on the received determination operation information;
acquire movement information of the plurality of laser pointers from the plurality of laser pointers,
wherein the acquired movement information of the plurality of laser pointers indicates movement of the plurality of laser pointers;
output a control signal based on the acquired movement information of the plurality of laser pointers; and
control movement of the object in the projection image based on the control signal and the determination of the object as the operation target, wherein
the movement of the object is similar to the movement of the plurality of laser pointers.

2. The information processing apparatus according to claim 1,
wherein the determination operation information is detected by the laser pointer.

3. The information processing apparatus according to claim 1, wherein the CPU is further configured to recognize at least one of a first position coordinate of the first irradiation position of the non-visible light marker emitted by the laser pointer or a second position coordinate of a second irradiation position of a visible light marker emitted by the laser pointer.

4. The information processing apparatus according to claim 3, wherein at least one of the visible light marker or the non-visible light marker is one of a figure, a one-dimensional bar code, or a two-dimensional bar code.

5. The information processing apparatus according to claim 3, wherein the CPU is further configured to acquire the movement information based on a distortion of at least one of the visible light marker or the non-visible light marker.

6. The information processing apparatus according to claim 1, wherein the movement information is associated with at least one of a vertical direction movement of the laser pointer, a horizontal direction movement of the laser pointer, a rotation movement of the laser pointer, a pan movement of the laser pointer, or a tilt movement of the laser pointer with respect to the projection image.

7. The information processing apparatus according to claim 1, wherein the CPU is further configured to:
control projection of a coordinate recognition image of non-visible light, wherein
the projected coordinate recognition image is superimposed on the projection image, and
the laser pointer:
recognizes the projected coordinate recognition image,
reads coordinate specification information from the recognized coordinate recognition image, and
transmits the read coordinate specification information to the information processing apparatus; and
recognize a second irradiation position of visible light on the projection image based on the coordinate specification information.

8. The information processing apparatus according to claim 1, wherein the CPU is further configured to recognize at least one of a second irradiation position that corresponds to visible light on the projection image or the first irradiation position based on at least one of:
at least one of a shape of a visible light marker or the shape of the non-visible light marker,
a color of at least one of the visible light marker or the non-visible light marker, or
a user ID embedded in at least one of the visible light marker or the non-visible light marker.

9. The information processing apparatus according to claim 1, wherein the movement information is detected by at least a sensor device in each laser pointer of the plurality of laser pointers.

10. The information processing apparatus according to claim 1, wherein
the CPU is further configured to change at least one of the first irradiation position or a second irradiation position to a third irradiation position based on a track of at least one of the first irradiation position or the second irradiation position, and
the second irradiation position corresponds to visible light emitted, on the projection image, by the laser pointer.

11. The information processing apparatus according to claim 10, wherein
the CPU is further configured to trace the track of at least one of the first irradiation position or the second irradiation position based on the control signal, and
the control signal corresponds to pointer information that includes the movement information.

12. The information processing apparatus according to claim 11, wherein the CPU is further configured to output at least one of a cancellation command or a deletion command as the pointer information based on the traced track, and
the traced track corresponds to a horizontal track of at least one of the first irradiation position or the second irradiation position.

13. A control method, comprising:
recognizing an irradiation position of a non-visible light marker emitted, on a projection image, by a laser pointer of a plurality of laser pointers, wherein
the projection image includes a plurality of objects,
the plurality of objects are different from the non-visible light marker,
the irradiation position is recognized based on a difference between the projection image and a non-visible light captured image, and
the non-visible light captured image includes the non-visible light marker;
receiving determination operation information from the plurality of laser pointers;
determining an object, from the plurality of objects, that corresponds to the irradiation position of the non-visible light marker in the projection image as an operation target, wherein the object is determined as the operation target based on the received determination operation information;
acquiring movement information of the plurality of laser pointers from the plurality of laser pointers,
wherein the acquired movement information of the plurality of laser pointers indicates movement of the plurality of laser pointers;
outputting a control signal based on the acquired movement information of the plurality of laser pointers; and
controlling movement of the object in the projection image based on the control signal and the determination of the object as the operation target, wherein
the movement of the object is similar to the movement of the plurality of laser pointers.

14. A non-transitory computer-readable medium having stored thereon computer-executable instructions that, when executed by a computer, cause the computer to execute operations, the operations comprising:
recognizing an irradiation position of a non-visible light marker emitted, on a projection image, by a laser pointer of a plurality of laser pointers, wherein
the projection image includes a plurality of objects,
the plurality of objects are different from the non-visible light marker,
the irradiation position is recognized based on a difference between the projection image and a non-visible light captured image, and
the non-visible light captured image includes the non-visible light marker;
receiving determination operation information from the plurality of laser pointers;
determining an object, from the plurality of objects, that corresponds to the irradiation position of the non-visible light marker in the projection image as an operation target, wherein the object is determined as the operation target based on the received determination operation information;
acquiring movement information of the plurality of laser pointers from the plurality of laser pointers,
wherein the acquired movement information of the plurality of laser pointers indicates movement of the plurality of laser pointers;

outputting a control signal based on the acquired movement information of the plurality of laser pointers; and
controlling movement of the object in the projection image based on the control signal and the determination of the object as the operation target, wherein the movement of the object is similar to the movement of the plurality of laser pointers.

* * * * *